US010032538B2

(12) United States Patent
Shumaker et al.

(10) Patent No.: US 10,032,538 B2
(45) Date of Patent: *Jul. 24, 2018

(54) DEFORMABLE ELASTOMERIC CONDUCTORS AND DIFFERENTIAL ELECTRONIC SIGNAL TRANSMISSION

(71) Applicant: The United States of America, as represented by Sec. of the Army, Washington, DC (US)

(72) Inventors: Justin L. Shumaker, Aberdeen, MD (US); Geoffrey A. Slipher, Baltimore, MD (US); Randy A. Mrozek, Port Deposit, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 401 days.

This patent is subject to a terminal disclaimer.

(21) Appl. No.: 14/163,016

(22) Filed: Jan. 24, 2014

(65) Prior Publication Data

US 2015/0129276 A1    May 14, 2015

Related U.S. Application Data

(60) Provisional application No. 61/903,773, filed on Nov. 13, 2013.

(51) Int. Cl.
*H01B 1/24* (2006.01)
*B64D 1/00* (2006.01)
(Continued)

(52) U.S. Cl.
CPC ............... *H01B 1/24* (2013.01); *B64D 17/02* (2013.01); *H01B 1/22* (2013.01); *H01B 3/28* (2013.01);
(Continued)

(58) Field of Classification Search
CPC . B64D 1/00; B64D 17/00; H01B 1/22; H01B 3/28; H01B 3/30; H01B 3/40;
(Continued)

(56) References Cited

U.S. PATENT DOCUMENTS 5,150,516 A * 9/1992 Boero .................. B23Q 1/00
29/412
6,787,694 B1 * 9/2004 Vexler .................. H01B 11/002
174/113 R (Continued)

FOREIGN PATENT DOCUMENTS

WO    2013022030 A1    2/2013

OTHER PUBLICATIONS

Mooney, M., "A theory of large elastic deformation," Journal of Applied Physics, 11(9), pp. 582-592 (1940).
(Continued)

*Primary Examiner* — Mark Kopec
*Assistant Examiner* — Danny N Kang
(74) *Attorney, Agent, or Firm* — Eric Brett Compton

(57) ABSTRACT

This application generally relates to deformable elastomeric conductors and differential signaling transmission techniques. According to one embodiment, a deformable elastomeric conductor is configured to transmit electrical signals. It comprises: an elastomeric polymer matrix; and conductive filler material uniformly dispersed in the elastomeric polymer matrix sufficient to render the material electrically conductive. The conductive filler material may include substantially non-entangled particles having an aspect ratio sufficiently large to enable the particles to substantially remain in contact and/or in close proximity with adjacent particles so as to maintain conductive pathways in the material when the material is subjected to deformation up to and exceeding 10% strain. Thus, over a
(Continued)

transmission distance of an electrical signal through the conductor, the transmission does not suffer greater than about 3 dB of signal attenuation when subjected to the deformation.

22 Claims, 30 Drawing Sheets

(51) Int. Cl.
- H01B 1/22 (2006.01)
- H01B 3/30 (2006.01)
- H01B 3/44 (2006.01)
- H01B 3/40 (2006.01)
- H01B 3/28 (2006.01)
- H01B 3/46 (2006.01)
- B64D 17/02 (2006.01)

(52) U.S. Cl.
CPC .............. *H01B 3/30* (2013.01); *H01B 3/305* (2013.01); *H01B 3/306* (2013.01); *H01B 3/40* (2013.01); *H01B 3/441* (2013.01); *H01B 3/442* (2013.01); *H01B 3/443* (2013.01); *H01B 3/445* (2013.01); *H01B 3/447* (2013.01); *H01B 3/46* (2013.01)

(58) Field of Classification Search
CPC .......... H01B 3/46; H01B 3/305; H01B 3/306; H01B 3/441; H01B 3/442; H01B 3/443; H01B 3/445; H01B 3/447; H04L 5/14
USPC ........... 174/209; 244/142; 370/276; 252/500
See application file for complete search history.

(56) References Cited

U.S. PATENT DOCUMENTS

| | | | |
|---|---|---|---|
| 2010/0116527 A1 | 5/2010 | Khosa et al. | |
| 2011/0096025 A1* | 4/2011 | Slobodin | G06F 3/044 345/174 |
| 2011/0256383 A1 | 10/2011 | Cochet et al. | |
| 2012/0251824 A1* | 10/2012 | Hur | H01B 1/02 428/378 |
| 2012/0312102 A1 | 12/2012 | Alvarez et al. | |
| 2013/0214214 A1* | 8/2013 | Carnahan | H01B 1/24 252/511 |
| 2013/0251943 A1* | 9/2013 | Pei | H01B 1/02 428/141 |
| 2013/0310495 A1 | 11/2013 | Kim et al. | |
| 2014/0090884 A1* | 4/2014 | Kobayashi | H01B 1/22 174/388 |
| 2014/0291589 A1 | 10/2014 | Hata et al. | |

OTHER PUBLICATIONS

Rivlin, R. S., "Large elastic deformations of isotropic materials. IV. Further developments of the general theory," Philosophical Transactions of the Royal Society of London. Series A, Mathematical and Physical Sciences, 241(835), pp. 379-397 (1948) (abstract).

Tsuyoshi Sekitani et al., "A Rubberlike Stretchable Active Matrix Using Elastic Conductors," Science 321, 1468 (2008).

Priya Ganapati, "To Charge your iPod, Plug in Your Jeans," Wired.com, Jan. 21, 2010. [Available at: http://www.wired.com/gadgetlab/2010/01/e-textile-charge/].

Mrozek et al., "Highly conductive, melt processable polymer composites based on nickel and low melting eutectic metal," Polymer (2010) 51 2954-2958.

Li et al, "Computational study on entanglement length and pore size of carbon nanotube buckypaper," Appl. Phys. Lett. (2012), 100, 021907.

Geoffrey A. Slipher, Randy A. Mrozek & Justin L. Shumaker, "Tunable Band-Pass Filters Employing Stretchable Electronic Components," Proceedings of the ASME 2012 Conference on Smart Materials, Adaptive Structures and Intelligent Systems SMASIS2012, Sep. 19-21, 2012, Stone Mountain, Georgia, USA (paper and slide presentation).

Lin et al., "Towards Tunable Sensitivity of Electrical Property to Strain for Conductive Polymer Composites Based on Thermoplastic Elastomer," ACS Appl. Mater. Interfaces 2013, 5, 5815-5824.

Spencer Ackerman, "MIT Wants Tomorrow's Soldiers to Talk Through Their Shirts" Wired.com, Feb. 18, 2013. [Available at: http://www.wired.com/dangerroom/2013/02/microfibers-army/].

U.S. Appl. No. 14/037,991 to Randy Mrozek et al. titled "Solvent Assisted Processing to Control the Mechanical Properties of Electrically and/or Thermally Conductive Polymer Composites" filed Sep. 26, 2013.

U.S. Appl. No. 61/883,171 to Randy Mrozek et al. titled "Porous Polymer Composites" filed Sep. 26, 2013.

Haines & Maassen Metallhandelsgesellschaft mbH "Low Melting Point Alloys based on Bismuth, Indium or Gallium" product literature webpage http://www.haines-maassen.com/en/indium_en/9-erden-en/79-nleg_en.html (2015).

Asbury Carbon Fiber Product Guide Sheet (asbury.com) rev Apr. 2011.

Sabit Adanur and Tianyi Liao, "Fiber Arrangement Characteristics and Their Effects on Nonwoven Tensile Behavior," Textile Res. J., 69(11)816-824 (1999).

Reto Haggenmueller et al., "Single Wall Carbon Nanotube/Polyethylene Nanocomposites: Thermal and Electrical Conductivity," Macromolecules 2007, 40, 2417-2421.

Ingo Alig et al., "Establishment, morphology and properties of carbon nanotube networks in polymer melts," Polymer 53 (2012) 4-28.

* cited by examiner

DEFORMABLE ELASTOMERIC CONDUCTORS AND DIFFERENTIAL ELECTRONIC SIGNAL TRANSMISSION

CROSS REFERENCE TO RELATED APPLICATION(S)

This application claims the benefit of U.S. Provisional Patent Application No. 61/903,773 titled "Deformable Polymer Composites with Controlled Electrical Performance During Deformation through Tailored Strain-Dependent Conductive Filler Contact," that was filed on Nov. 13, 2013, herein incorporated by reference in its entirety for all purposes.

GOVERNMENT INTEREST

Governmental Interest—The invention described herein may be manufactured, used and licensed by or for the U.S. Government.

FIELD

The present invention relates to deformable elastomeric conductors and differential electronic signal transmission.

BACKGROUND

Conventional differential signal technologies typically use metal conductors for signal transmission. For many applications, a flexible or stretchable conductor is desired. Present so-called "stretchable" conductor devices use a meandering approach that consists of meandering metallic pathways that bend and/or fold in three dimensions to permit stretching of the transmission line in a way similar to how a spring "stretches". These meandering conductors are not elastic, and therefore require a different volumetric space to permit the bending and folding to occur resulting in a different set of operating limitations. Such metallic film conductors therefore have limited strain before failure, typically limited to less than 3% in the metal before metallic fracture. This limits both the final device geometries and production methods that can be used to produce stretchable electronic components and interconnects using metallic films. A deformable or stretchable conductor device would be beneficial and uniquely different from meandering conductors in terms of combined electrical and mechanical performance.

BRIEF SUMMARY OF THE INVENTION

Embodiments of the invention generally relate to deformable elastomeric conductors and differential signaling transmission techniques which may be used in high strain environments using integrated conformal wiring, such as, soldier uniforms, electronically instrumented intelligent parachute canopies, electronically instrumented intelligent car or truck tires, or flexible robotic systems.

According to one embodiment, a deformable elastomeric conductor is configured to transmit electrical signals. It comprises: an elastomeric polymer matrix; and conductive filler material uniformly dispersed in the elastomeric polymer matrix sufficient to render the material electrically conductive. The conductive filler material may include a plurality of substantially non-entangled particles having an aspect ratio sufficiently large to enable the particles to substantially remain in contact and/or in close proximity with adjacent particles so as to maintain conductive pathways in the material when the material is subjected to deformation up to and exceeding 10% strain. Thus, over a transmission distance of an electrical signal through the conductor, the transmission does not suffer greater than about 3 dB of signal attenuation when subjected to the deformation.

The elastomeric polymer matrix may comprise, for example, one or more of: poly(styrene-b-isoprene-b-styrene), poly(styrene-b-ethylene-co-butylene-b-styrene), poly(styrene-b-butadiene-b-styrene), polybutadiene, natural rubber, silicone elastomer, epoxy elastomer, polypropylene oxide) rubber, chloroprene, butyl elastomers, acrylonitrile butadiene styrene, butyl elastomer, nitrile elastomer, polydimethylsiloxane (PDMS), neoprene, polyisoprene, acrylic, polyurethane, nylon, polyethylene, polypropylene, polystyrene, polyvinyl chloride (PVC), styrene-iso-styrene (SIS), polytetrafluoroethylene, epoxy resin, or polyimide. And, the conductive filler material may comprise, for example, one or more of: nickel-coated carbon fibers, nickel nanorods, nickel flakes, nickel-coated graphite, copper nanorods, copper flakes, nickel nanostrands, nickel-coated carbon nanotubes, silver nanorods, silver flakes, copper fiber, silver fiber, nickel fiber, stainless steel fiber, gold nanorods, gold flakes, gold fibers, graphene flakes, graphite flakes, carbon nanofiber, or non-entangled carbon nanotubes.

Depending on the application, the length of the conductor can from range from the order of a millimeter to a meter (and perhaps even longer). The aspect ratio of the filler material typically will be greater than 1.5. And the amount of particles in the elastomeric polymer matrix may range from 0.01 to 50 volume percent (vol. %).

The electrical signals to be transmitted by the conductor can include: AC power, DC power, analog signals, digital signals, audio signals, telephony signals, voice signals, computer data, sensor data, control signals, or electronic information. For some applications, the deformable elastomeric conductor may be attached to, or incorporated into, a structure which is configured to readily bend, flex, deform, or stretch. The conductor thus can readily conform to the body of structure as it bends, flexes, deforms, or stretches. The structure may include clothing, textile, or fabric material, for example. And the deformable elastomeric conductor can be applied as a coating to the structure.

In some embodiments, the deformable elastomeric conductor may further include a deformable insulating material encapsulating the elastomeric polymer matrix. Additionally, a deformable conductive shielded can be embedded in the deformable insulating material to shield against electromagnetic interference (EMI). The conductive shield may be formed of the same material as the elastomeric polymer matrix in some instances. The conductor can be formed into a wire, cable, twisted pair wires, ribbon cable, or electrical bus.

According to another embodiment, a system includes at least one deformable elastomeric conductor between a transmission node and a receiving node defining a channel. The system can be configured for duplex transmission including: a first transmission node and a first receiving node defining a first channel; and a second transmission node and a second receiving node defining a second channel. Depending on the application, the system may be configured for Ethernet, Universal Serial Bus (USB), PCI, HDMI, Display Port, Firewire, RS-422, or RS-485 communication protocols. And, according to yet another embodiment, a method comprises transmitting an electrical signal through a deformable elastomeric conductor.

According to an even further embodiment, an airdrop application comprises: a parachute having at least one sensor or actuator array; and at least one deformable elastomeric conductor connected to the at least one sensor or actuator.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. These embodiments are intended to be included within the following description and protected by the accompanying claims.

FIG. 6A shows an embodiment of a flat cable which is unshielded. FIG. 6B shows an embodiment of a flat coaxial cable which is shielded and EMI resistant. FIG. 6C shows an embodiment of a round coaxial cable which is shielded.

FIG. 8 shows a plot of impedance of one deformable elastomeric conductor subjected to various uniaxial strains. FIG. 9 shows a plot of signal gain of the deformable elastomeric conductor subjected to same uniaxial strains as in the plot of FIG. 8. FIG. 10 shows the reference differential signal for a pair of deformable elastomeric conductors subjected to 76% uniaxial strain. FIG. 11 shows the output differential signal of the pair of deformable elastomeric conductors subjected to 76% uniaxial strain.

FIG. 13A shows a serial bus architecture with redundancy. FIG. 13B shows an Ethernet architecture having two switches.

DETAILED DESCRIPTION

An innovative technology for transmitting electric power and/or electronic signals via a conductive member that readily deforms and is capable of functioning even when subjected to high deformation or strain is disclosed herein. This technology does not use a conventional metal conductor, but instead uses a deformable elastomeric conductor material, which readily permits elastic deformation. Essentially any high strain environment requiring power and data transmission that operates in an elastic manner may benefit from this technology.

Figure 1:
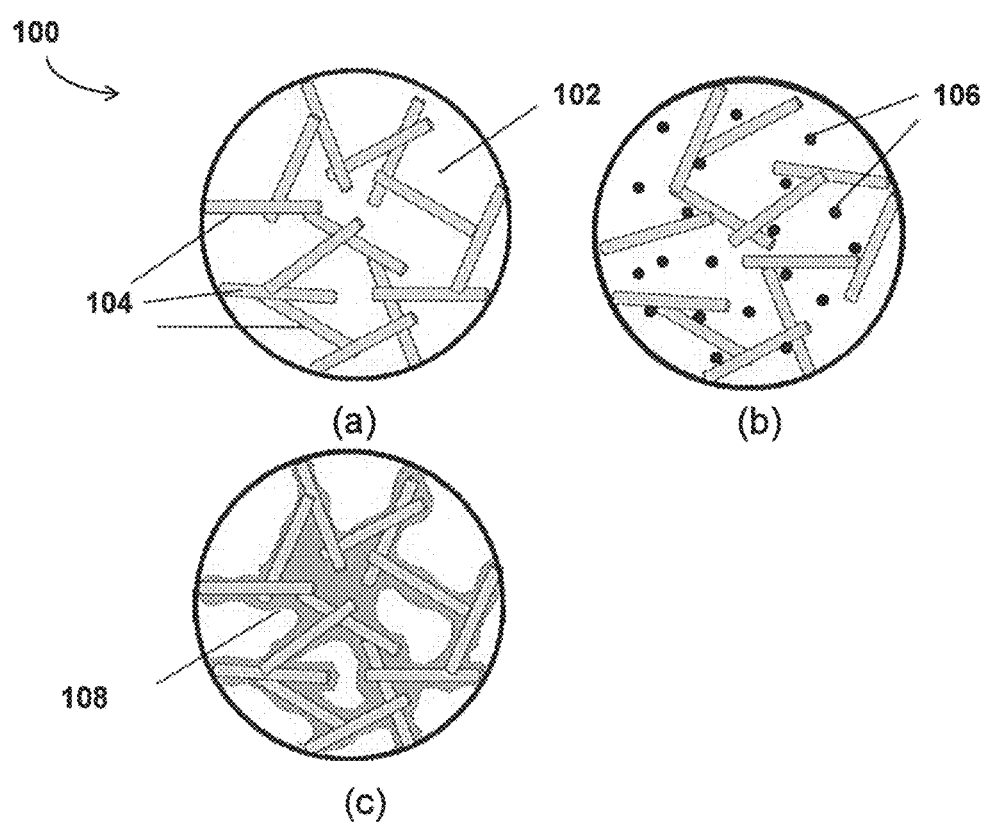
FIG. 1 shows exemplary schematics of a sample portion of a deformable elastomeric conductive material according to embodiments.

FIG. 1 shows exemplary schematics of sample portions of deformable elastomeric conductive composite material 100 according to embodiments. The sample portion is illustrated within the circle portion in the figure; however, it should be appreciated that the material 100 may be formed in various shapes, sizes and other forms as desired. The material 100 is configured to be deformed and sufficiently maintain conductive performance during tension (stretching), compression (squeezing), and/or mixed mode deformations, like twisting, while maintaining or controlling performance.

In general, as illustrated in FIG. 1(a), the deformable elastomeric conductive composite material 100 is formed of an elastomeric polymer matrix material 102 having conductive filler material 104 that i s substantially uniformly dispersed therein. Due to the elastomeric polymer matrix material 102, the elastomeric conductive material 100 is relatively compliant and elastic in nature. Elastic as used herein refers to elastic deformation, which is typically defined as reversible deformation, rather than permanent (plastic) deformation. It is typically characterized as having a linear response (or slope) with regards to stress/strain. However, for some embodiments described herein and envisioned for a typical application-space, the linear stress-strain region may no longer apply and a non-linear hyperelastic material model must be considered (e.g. as described in Mooney, M., "A theory of large elastic deformation," Journal of Applied Physics, 11(9), pp. 582-592 (1940) & Rivlin, R. S., "Large elastic deformations of isotropic materials. IV. Further developments of the general theory," Philosophical Transactions of the Royal Society of London. Series A, Mathematical and Physical Sciences, 241(835), pp. 379-397 (1948)).

Straining a polymer containing conductive fillers can result in decreasing conductivity due to an increased spacing between particles, such as discussed in Lin et al., "Towards Tunable Sensitivity of Electrical Property to Strain for Conductive Polymer Composites Based on Thermoplastic Elastomer," ACS Appl. Mater. Interfaces 2013, 5, 5815-5824. To provide constant or increasing conductivity, the increased particle spacing when strained must be mitigated. To this end, to maintain constant conductivity regardless of strain, the material 100 utilizes conductive filler materials 104 in the polymer 102 that can "slide" along each other, but remain in contact and/or in close proximity to provide conductive pathways at small and large deformations (such as greater than 10% strain) and/or in complex deformation modes like twisting or biaxial stretching. The filler particles 104 may be substantially straight (elongated) and rigid, in some embodiments, to prevent entanglements there between, as further discussed below.

As known in the art, the term "strain" is defined as the amount of deformation due to stretching an object experiences compared to its original size and/or shape. Strain is typically given as dimensionless or normalized values. Uniaxial strain is strain which is substantially related to, or affecting, substantially only one axis. Biaxial strain is strain in two perpendicular axes. While electrical conduction is a primary focus to enable deformable or stretchable electronic device production, it should be appreciated that the same materials could be used to provide thermal conductive capabilities also.

The conductive filler material 104 comprises a plurality of substantially non-entangled particles which have an aspect ratio sufficiently large to enable the particles to substantially remain in contact and/or in close proximity with adjacent particles so as to maintain conductive pathways in the material 100 when the material is subjected to deformation up to, and exceeding 10% strain. The innovative materials described herein may be designed to controlled electrical performance from 1 to 100% strain, for instance. Above 10% strain, and more particularly, 20% to 100% strain, may be of considerable importance for many applications. Although, it is believed that embodiments can be prepared which enable elongation up to and in excess of 500% which will enable additional applications.

Under deformation, the filler particles will orient relative to the deformation and the large number of inter-particle connections produced by the particles having an aspect ratio greater than 1 will result in maintained conductive pathways. More particular, the aspect ratio (AR) of the filler materials 104 plays an important role to this end. In general, the AR is defined as the ratio of width (or length) to height of an element. Many filler materials can be approximated as a small cylindrical-like element, for example.

Figures 2A, 2B:
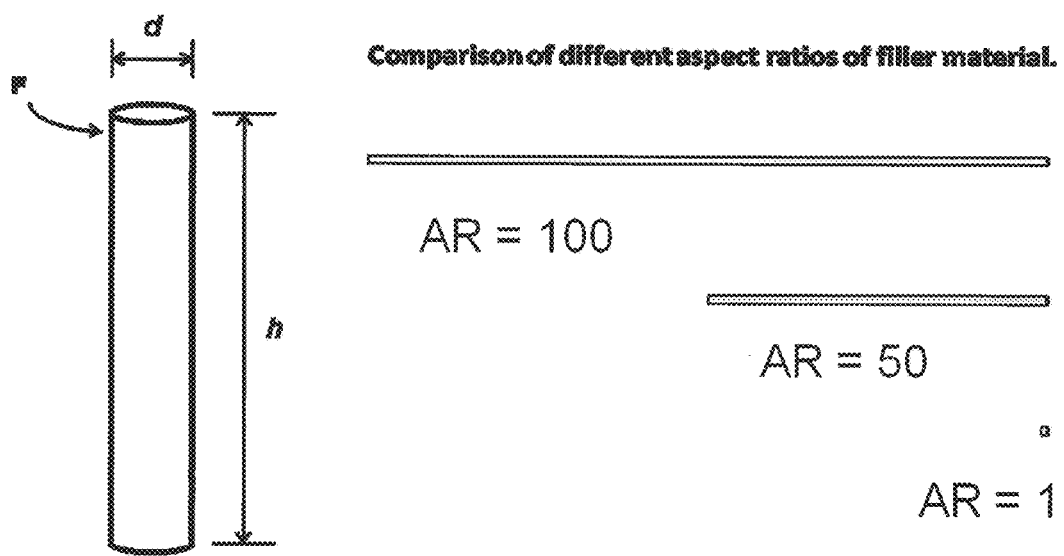
FIG. 2A is a conceptual schematic for a cylinder-like filler element.
FIG. 2B is a schematic showing a comparison of different aspect ratios of filler material.

FIG. 2A is a conceptual schematic for an exemplary cylindrical filler element F having a diameter d and height h. The AR of a cylindrical-like filler element may be defined as the ratio of its height h to its diameter d. (An AR of 5, for instance, would mean that the height of the cylindrical-like filler element is 5 times its diameter). FIG. 2B is a schematic showing a comparison of different aspect ratios of filler exemplary material having ARs of 1, 50 and 100, respectively. This figure shows the relative differences in filler geometry associated with a transition from low to high aspect ratio.

The characteristic dimension of the filler conductive particles can vary between a few nanometers to a few microns, for instance. Some conductive particles having ARs on the order of 1 (e.g. spheres) may not be readily capable of providing performance when significantly stretched. Rather, high aspect ratio particles, having an AR ranging from as little as 1.5 to 3 and upwards to approximately 100,000 may be used. Strains of approximately 10% may only require an AR of 1.5 depending on concentration, for instance. Higher strain deformation may require higher AR filler particles. Although, there is no theoretical limit to the aspect ratio of the fillers.

The addition of high AR particles, i.e., particles with AR greater than 1.5, to a host polymer can result in decreased elasticity. While this negative impact is expected due to the particle geometry, the magnitude of the impact is often enhanced through strong particle-particle interactions coupled with physical entanglement of the particles hindering particle movement upon deformation. Therefore, if the particle entanglements are sufficiently eliminated, or the particle-particle frictional forces reduced, then the particles will "slide" across each other, while maintaining electrical percolation during large deformations.

Various elastomeric materials for the polymer 102 can be used, provided that they lend themselves to incorporating the conductive filler material with homogenous distribution therein. For instance, the deformable polymer matrix material may be formed of various polymeric, rubber, resin, plastic materials, or the like. They can include thermosetting polymers and thermoplastic. Of course, the choice of a particular polymer matrix material 102 may be driven by the particular application environment that is anticipated.

For example, viable deformable polymeric matrix materials 102 may include, but are not necessary limited to: poly(styrene-b-isoprene-b-styrene), poly(styrene-b-ethylene-co-butylene-b-styrene), poly(styrene-b-butadiene-b-styrene), polybutadiene, natural rubber, silicone elastomer, epoxy elastomer, polypropylene oxide) rubber, chloroprene, butyl elastomers, acrylonitrile butadiene styrene, butyl elastomer, nitrile elastomer, polydimethylsiloxane (PDMS), neoprene, polyisoprene, acrylic, polyurethane, nylon, polyethylene, polypropylene, polystyrene, polyvinyl chloride (PVC), styrene-iso-styrene (SIS), polytetrafluoroethylene (e.g., Teflon®), epoxy resin, or polyimide. A mixture of two or more polymer materials 102 may also be used in the composite material 100.

There are many conductive filler materials 104 which can provide adequate conductivity to transmit electricity and/or thermal energy in the composite material 100. Generally, conductive filler materials 104 may be utilized that are capable of exhibiting sufficient electron mobility in the presence of an electric field. Some examples of conductive fillers 104 may include, but are not necessary limited to: nickel-coated carbon fibers, nickel nanorods, nickel flakes, nickel-coated graphite, copper nanorods, copper flakes, nickel nanostrands, nickel-coated carbon nanotubes, silver nanorods, silver flakes, copper fiber, silver fiber, nickel fiber, stainless steel fiber, gold nanorods, gold flakes, gold fibers, graphene flakes, graphite flakes, carbon nanofiber, or non-entangled carbon nanotubes. Mixtures of one or multiple filler materials (including those of different ARs) may also be used in certain implementations.

Carbon nanotubes (CNT) may present a challenge. For instance, when CNTs reach a certain length (generally dependent on their diameter), they will become entangled. This length will depend on the bending stiffness and binding energy of the CNT. (See, e.g., Li et al, "Computational study on entanglement length and pore size of carbon nanotube buckypaper," Appl. Phys. Lett. (2012), 100, 021907). But there are many different types of CNTs, and thus their specific lengths resulting in entanglements may vary. In any event, it is believed that short carbon nanotubes, which generally will remain in a substantially non-entangled arrangement, will work (although, this is counter to the research direction of the community where longer carbon nanotubes are recognized as enabling conductivities at lower concentrations). In both cases, they remain flexible and would not be considered rigid.

The conductive filler materials 104 are illustrated as having a cylindrical shape. However, this is for ease of illustration, and this is not limiting; it should be appreciated that they may have various other cross-sectional forms, such as linear, platelet-like, rectilinear, square, etc.

The material 100 utilizes controlled contact and/or close proximity between adjacent filler material 104 in the polymer 102 to provide a tailored conductive (e.g., electrical, thermal) response when subjected to deformation. It is ideal if particles are truly in physical contact with adjacent particles; however, electrical conductivity can occur by a "hopping" mechanism. As a result, the non-entangled particles only need to be close enough to enable hopping of electrons. Thermal conductivity, on the other hand, generally requires at least some direct contact of adjacent particles.

This material 100 can be fabricated to exhibit increasing, decreasing, and maintained conductivity with increasing strain to facilitate a new class of highly deformable, stretchable electronic devices. These devices can be implemented into platforms previously inaccessible to traditional rigid electronics to provide enhanced capabilities on the battlefield and in the civilian sector.

The conductive filler materials 104 minimizes the well-understood negative impacts of conventional conductive particle addition by eliminating particle entanglements and reducing particle friction forces to allow filler particles 104 to slide along each other, maintaining electrically conductive pathways in the material.

Filler particles 104 are typically received as larger aggregates from the vendor primarily due to the large surface energy of the particles. The aggregation becomes even more pronounced at smaller sizes due to the higher surface area-to-volume ratio. Typically, these aggregated groups of particles need to be disrupted and the particles dispersed individually to provide uniform performance in the composite. For example, aggregation may be used to an advantage by using the strain to "break up" the individual particles in the aggregate but the particles will remain in close proximity due to the polymer matrix they are embedded in. The particle size will generally remain constant whether dispersed or in a bundle. In some embodiments, multiple particle sizes or aspect ratios may be used. The amount of particles in each bundle, may depend on the particle chemistry, particle size, and the mixing state ranging from very few (e.g., 3-5) to several 100 s (e.g., 100-500). Most commonly Van Der Waals forces keep the filler particles together in the bundles. However, some aggregates may be held together by hydrogen bonding or electrostatic interactions. Aggregates are often arranged in a manner that maximizes surface interaction (e.g., parallel in the case of cylinders or sheets). However, they can also be disordered as the result of entropy or an artifact of the production process.

In various embodiments, the material 100 may further be formed with additional conductive additives that eliminate entanglements and/or reduce friction between adjacent particles to promote "sliding" across each other and maintain electrical pathways during deformation. For instance, as illustrated in FIG. 1(b), solid additives 106 may optionally be included in the polymer 102 in some embodiments to further enhance the sliding action of the fillers 104. Examples of these may include spherical particles include $C_{60}$ "buckyballs" and conductive nickel spheres. Of course, other small particles may also be used.

The size of the conductive proximally spherical particles depends on the application. However, it is envisioned that the range of sizes could be from around 1.5 nm (e.g., for buckyballs) to 500 μm (e.g., for other, larger particles). It is envisioned that for many applications, the particle size should be approximately $1/10^{th}$ the thickness of the sample. However, there is no theoretical limit to the particle size if the material dimensions in the application are large enough and the particle size can be as large as ½ the thickness (it is noted that this may require a higher concentration of particles in some instance). The amounts could vary from 0.5 volume percent to 50 volume percent, for instance.

Additionally, as illustrated in FIG. 1(c), other conductive liquid additives 108 may optionally be included in the polymer 102 in some embodiments to help maintain conductive pathways therein. While the liquid additives 108 are illustrated as globules in the figures, it should be appreciated that the liquids will be dispersed (partial or fully) in the polymer matrix 102. Moreover, they advantageously "wet" or "coat" the filler materials 104 (as better illustrated in FIG. 4a).

For example, a room temperature liquid eutectic metal alloy (e.g. Gallium/Indium or Gallium/Indium/Tin (i.e. Galinstan®)) and/or ionic liquid (e.g., 1-ethyl-3-methylimidazolium chloride, 1-ethyl-3-methylimidazolium tetrafluoroborate, 1-butyl-3-methylimidazolium hexafluorophosphate, 1-butyl-3-methylimidazolium chloride, 1-alkylpyridinium chloride, and N-methyl-N-alkylpyrrolidinium hexafluorophosphate) could be incorporated along with the particulate to form highly conductive liquid metallic bridges or ionic liquid bridges, respectively, between adjacent particles. The amounts of conductive liquids could range anywhere from about 5 volume percent to act as conductive bridges between adjacent solid particles to about 80 volume percent where it is acting as a continuous conductivity medium. The conductive liquid 108 will deform during strain but will further help to maintain the conductive pathways between the particles. An advantage of this approach is that the liquid additive will offset the impact of the solid particulate on the mechanical properties and processability of the polymer while maintaining the electrical conductivity. In other embodiments, both the solid additives 106 and the conductive liquid additives 108 may be included in the polymer matrix 102.

Figure 3:
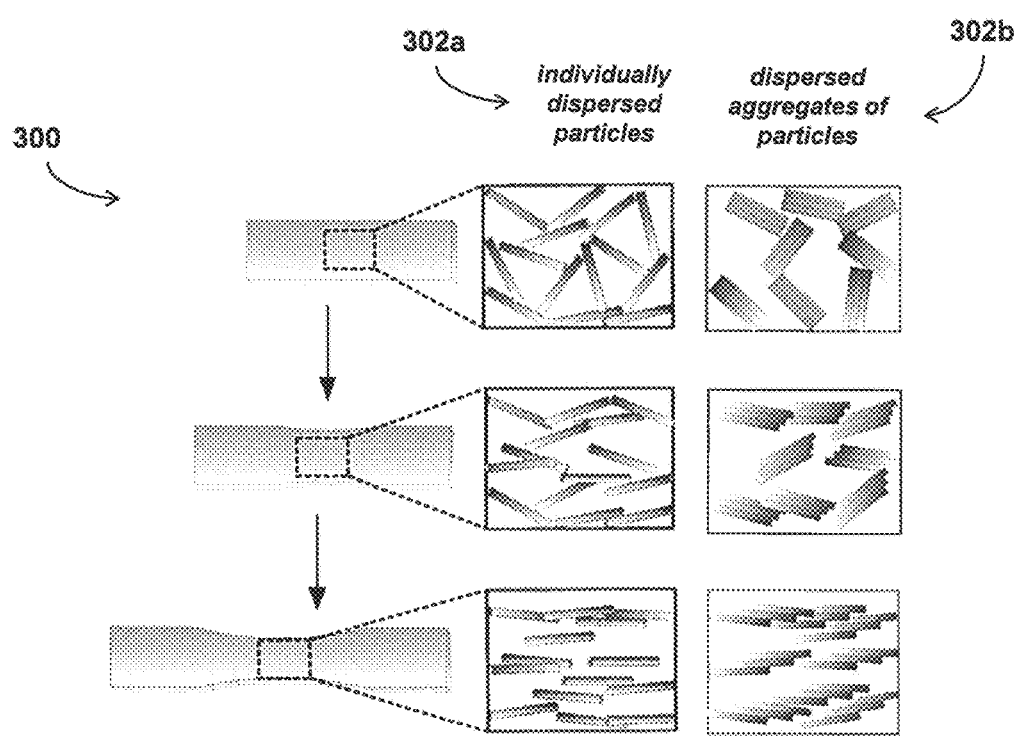
FIG. 3 shows a schematic of polymers filled with "controlled slip" high aspect ratio particles that will remain above the percolation threshold at large elongations.

FIG. 3 shows that sliding fillers can work with a) well dispersed individual particles 302a or with b) dispersed aggregates of multiple filler particles 302b in a material 300 subjected to increasing deformation (strain). In the former case, the individual particles 302a rotate and slide across each other as the material elongates. In the latter case, the aggregates 302b will rotate and slide across each while also potentially increasing dispersion to maintain conductive pathways.

Figure 4:
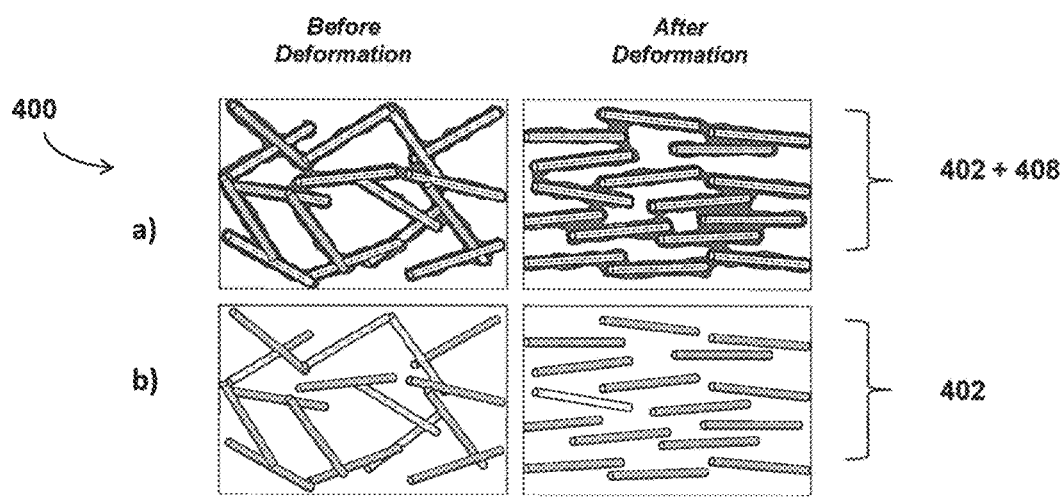
FIG. 4 shows schematics of a conductive fiber loaded composite at percolation a) with and b) without added eutectic metal before and after deformation.

FIG. 4 shows schematics of a conductive composite 400 loaded with filler material 402 at percolation a) with and b) without added eutectic metal 408 before and after deformation. The eutectic metal will generally help maintain conductivity during deformation rather than providing increased conductivity due to deformation.

Providing increased conductivity when the material is strained is a very difficult challenge that, to the inventors knowledge, no one is currently attempting to address. To increase conductivity, the inter-particle distance might be reduced or inter-particle contact might be increased upon deformation. This can be accomplished by utilizing weak polymer-filler interactions or tunable surfactants that, as-produced, will form a coating on the particles decreasing the contact between adjacent particles and the resulting conductivity.

Weak polymer-filler interactions refer to strength of the attractive interaction between the polymer and the particle surface. In these systems, an attractive (as opposed to repulsive) interaction may be desired that only slightly favors the polymer adsorbing onto the polymer surface (i.e. weakly attractive). As a result of this weak attractive interaction, the polymer will form a coating on the particle, but that coating can be removed with minimal force. (A real-world analog would be food on a Teflon pan where a small force is required to slide the food off the pan whereas a non-Teflon coated pan would typically require a greater force.) At a minimum, this interaction would require the cohesive strength to be higher than the adhesive strength (i.e. the failure occurs at the interface rather than the bulk polymer). It is believed this occurs in the poly(styrene-b-isoprene-b-styrene) composites containing nickel-coated carbon fiber (NCCF).

Although, it is noted that the strength of the polymer—particle surface interaction has not yet been measured. In a non-conductive system, the interaction between the polymer and particle surface could be optimized through chemical modification of the particle surface. However, chemical modification of a conductive surface typically reduces its conductivity. As an alternative, the polymer-particle interaction might be altered using non-covalent bonding through a surfactant. When the material is strained, the surfactant will have a higher interaction with the polymer than the particle surface and will, thereby, de-adhere from the surface.

Figure 5:
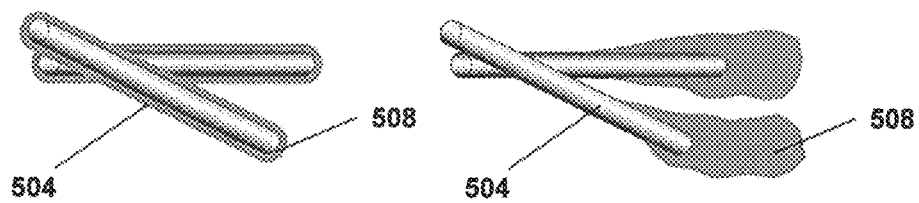
FIG. 5 shows schematic of a polymer coating that will delaminate upon deformation to increase conductivity and relax upon recovery from deformation to regain its lower conductivity state.

FIG. 5 is a schematic of a polymer coating 508 on fillers 504 that will delaminate upon deformation to increase conductivity and relax upon recovery from deformation to regain its lower conductivity state. Upon deformation, the weak polymer-particle interactions will result in the polymer delaminating from the conductive particle and peeling away from the particle surface allowing for increased contact between adjacent particles and increased conductivity. When the strain is removed, the polymer will relax and the coating will be recovered resulting in a reduced conductivity to the pre-strained value.

As produced, the particle spacing will be large enough to limit conductivity. The optimum particle spacing may depend on the strain-dependent electrical response required. For example, if the desired response is increasing conductivity starting at 5% strain the spacing will be closer than if the conductivity increase were to start at 25% strain. In addition, the application voltage will change the spacing as a higher voltage may require a larger spacing to prevent conductivity. Upon deformation, the porous elastomeric structure will collapse resulting in increased particle contact and enhanced conductivity. This same structure could be backfilled with a liquid conductor to produce redundant conductive pathways that exhibit uniform conductivity when strained. One exemplary liquid conductor that may be used is Galinstan (gallium-indium-tin eutectic). The amount used may be dependent on the pore volume and could be as high as 90 volume percent. Particle spacing may also be employed to control the distributed capacitance (reactive portion of impedance) throughout the material. The combination of spatially distributed resistive and reactive impedances form the basis of a mechanically responsive electronic filter (e.g. a band-pass filter that changes center frequency, gain, or bandwidth as a function of mechanical deformation).

A unique aspect and very important advantage of the innovative deformable elastomeric conductive materials is that it they lend themselves to tailoring the strain-dependent electrical behavior (inherent to the material; but do not require specialized geometries or patterning to tolerate strain). It has been found that targeted particle contact behavior is dependent on the desired electrical response when the strain is increased. To this end, the material 100 properties can be judiciously tailored for a particular application:
  Decreasing conductivity: decreased particle contact or increased particle spacing to reduce conductive pathways.
  Constant conductivity: uniform particle contact to maintain conductive pathways.
  Increasing conductivity: increased particle contact or reduced particle spacing to enhance the conductive pathways.

This is a significant departure from conventional technologies which required geometric patterning. For example, the deformable elastomeric conductive materials 100 advantageously maintain electrical conductivity, even at large deformation (e.g., greater than 10% and more preferably greater than 20% strain), and can exhibit a controlled increase or decrease in conductivity with increasing strain.

The highly deformable material can be used to replace traditional electronic components to enhance their utility in the field. In addition, the innovative materials can be used to form highly deformable devices which can be implemented into platforms that were previously inaccessible to traditional rigid electronics platforms including soft robotics, textiles (including high strain locations like knee and elbow bending), and monitoring electroencephalography (EEG) signals, electrocardiogram (EKG) signals, and vital signs on the battlefield in a physically comfortable and ballistically safe manner.

Accordingly, these material systems may enable the production of monolithic elastomeric sheets that exhibit controlled and tailored strain-dependent electrical conductivity and can be cut, printed, molded, or cast into the desired device design. This innovative technology does not require patterning to generate strain tolerant, conductive materials. Of course, if a specific application can accommodate patterning of the conductive material, this technology can be used in concert with geometric patterning to further enhance the stretchable electronic material performance. In addition, the same design principles to produce an elastomeric sheet can be used to produce a printable or sprayable ink to enhance the range of platforms accessible for implementation through additive manufacturing. The innovative technology can also be coupled with controlled localization and orientation of the filler using external electric and magnetic fields to tailor the electrical performance. This effect can be utilized to control the orientation of the particles to provide optimum performance in complex strain states like twisting or bending. In addition, conductivity can be obtained at lower overall particle loadings by producing locally concentrated conductive pathways in an elastomeric polymer matrix. Complex particulate organization and orientation can be obtained using a combination of non-uniform fields, to induce migration and localization, and uniform fields to refine orientation.

The utility of "sliding" filler contacts extends to processing of polymer composites containing high particle loadings that are relevant for melt processable electronic materials. To obtain relevant conductivity (e.g., greater than 0.01 S/cm) requires sufficient particle loading to produce very small particle spacing or, more ideally, direct particle contact. A specific density may not be that critical in all embodiments. Although, it should be noted that decreasing the weight can be accomplished by changing the filler type i.e. nickel-coated carbon fiber vs. nickel fiber. The amount of fillers in the polymer can generally range from about 0.01 to 50% vol.

At these high particle loadings, the close contact of the particles produces a dramatic increase in the melt viscosity of the polymer composite during melt processing. The increased viscosity can reduce or even eliminate the ability to process the material. However, the impact on the viscosity can be reduced by promoting sliding between adjacent fillers. As a result, the invention has broad applicability for melt processing of highly particle filled composites including elastomeric (i.e. stretchable rubbers) and rigid polymers.

The aspect ratio of the conductive filler materials 104 can be used to selectively tune the performance of the deformable elastomeric conductive material 100. Tolerance to operating conditions including strain, mechanical loading, signal frequency, and temperature can be selectively "tuned" to some degree by manipulating material constituents and processing. For example, capacitive roll-off frequency at which the electrical impedance begins to reduce associated with distributed capacitance has been tuned by adjusting filler aspect ratio and filler density. The roll-off frequency also changes with applied deformation, and the frequency at which roll-off occurs for a specific magnitude of deformation may also be tuned by adjusting filler aspect ratio and spatial density throughout the matrix. Additionally, the nominal (undeformed) reactive and resistive components of impedance can also be controlled in the material by adjusting the filler aspect ratio and particle concentration density.

Particle concentration density and spatial distribution of the fillers 104 throughout the polymer matrix material 102 can be used to bias the nominal starting electrical impedance, the slope of the electrical impedance response to applied deformation, and the frequency-dependent properties such as the frequency at which capacitive roll-off occurs, for instance, as well as to spatially grade the electrical and mechanical responses of the material (e.g. regions of the material that electrically turn on/off based on mechanical deformation state). Both reactive and real portions of electrical impedance can be influenced in the material by adjusting relative spatial densities and distributions of the filler material(s). When considering high aspect-ratio fillers, the orientation and distribution of oriented filler can also play a significant role in spatial uniformity of the impedance distribution in the material, and can be used to tune conductive pathways, impedance discontinuities, and spatially distributed filter mechanisms (e.g. spatially distributed band-pass filter) throughout the bulk material.

In some embodiments, the deformable elastomeric conductive material 100 may be fabricated according to any one of Examples 1-5 described in U.S. Provisional Patent Application No. 61/903,773, mentioned above. Although, it should be appreciated that these exemplary embodiments are not limiting.

Figure 2C:
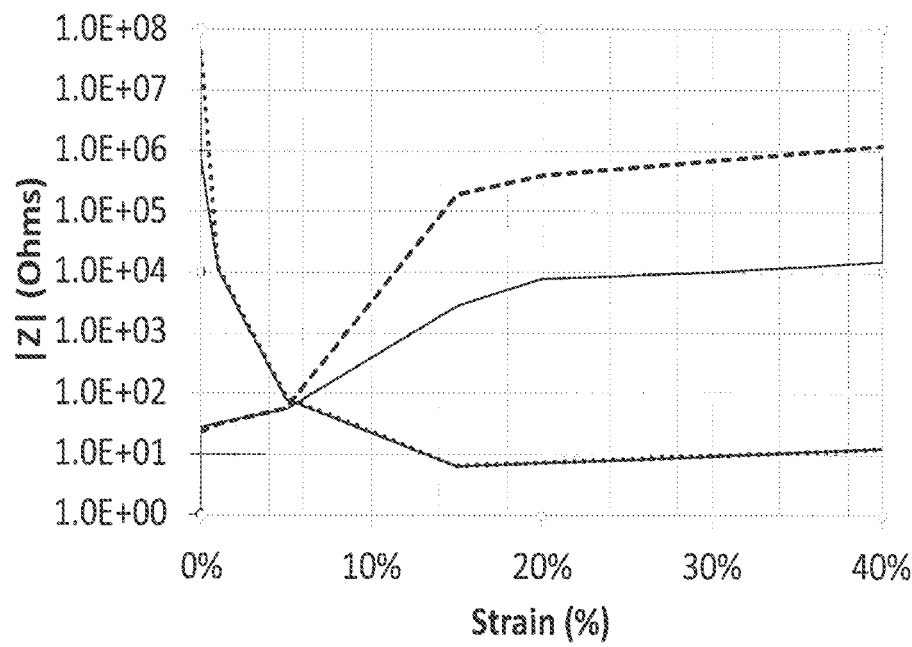
FIG. 2C is a plot showing examples of tunability of the impedance response to applied strain of a deformable elastomeric conductor as a function of the filler aspect ratio.

FIG. 2C is a plot showing examples of tunability of the impedance response to applied strain to a deformable elastomeric conductive material as a function of the conductor filler material aspect ratio. In particular, two different filled elastomeric conductors having filler materials of AR of 1 and 50 were tested at frequencies of 100 Hz and 1 MHz. The AR of 1 here is for colloidal silver nano-particles. The plot shows a comparison of the performance between these low and high aspect ratio fillers. Of particular note is the high tolerance to strain and decreased impedance with increasing strain exhibited by the deformable elastomeric conductor using the higher AR fillers.

Over time, the deformable elastomeric conductive material 100 may potentially suffer an eventual decay in signal transmission performance due to an increase in electrical impedance associated with excessive stretching and the resulting change in filler orientation geometry within the polymer matrix material 102. Using high AR fillers, though, can effectively increase the range of strains/stretch over which the material can maintain low enough electrical impedance as required for broadband signal transmission.

The deformable elastomeric conductive material 100 may be designed and fabricated to transmit electrical signals and data over a wider range of frequencies (e.g., Hz to GHz) and a wider range of strains (e.g., up to and in excess of 80%) without significantly compromising signal transmission and communication quality. Moreover, deformable elastomeric conductive material 100 may readily function at biaxial strain, such as resulting in a 50% change of area.

Also, the particular processing requirements may vary depending on the particular matrix material used. Many normally dielectric, or insulating, polymer materials can be rendered conductive by filling them with conductive fillers. Regardless of the polymer chosen as the matrix, the general trends associated with adding filler of a particular type will produce similar trends in electrical and mechanical behavior.

When considering processing techniques for a filled conductive polymer, there are multiple stages of processing to consider. These generally include a mixing stage at which the conductive filler material 104 is combined with the polymer matrix material 102, and a production stage during which the material is processed into a usable form. The specific steps during these stages can vary depending on the class of polymer used for the polymer matrix. The two broad classes of polymers—thermosetting polymers and thermoplastic—involve significantly different processing methods. Thermosetting polymers (or simply thermosets) are initially liquid and irreversibly cured to their final state, whereas thermoplastics may be re-melted and re-processed multiple times using the application of sufficiently high temperatures. Thermosets may be processed into a usable form during the production stage, for example, by reactive injection molding, extrusion molding, spin casting, and compression molding. On the other hand, thermoplastics may be processed into a usable form during the production stage by thermal pressing, injection molding, casting, three-dimensional (3D) printing (e.g., fused filament fabrication, or fused deposition modeling), extruding, and roll-to-roll processing, for instance.

The deformable elastomeric conductive material 100 can be manufactured into a finished product using a variety of techniques, including 3D printing, roll-to-roll processing, casting, and injection molding, for example. Moreover, if the polymer matrix material 102 is a thermoplastic elastomer that is melt-processible, manufacture of deformable conductive material 100 may be readily scaled to many current industrial processing methods. Material processing can provide a wide array of sizes and shapes of elastic wires.

Use of a thermoplastic elastomer matrix also allows for "iron-on" applications, in which the thermoplastic elastomer conductive material can be either chemically or mechanically bonded to a substrate (e.g. fabric) by application of heat and pressure while the deformable conductor and substrate to which it is to be bonded are held together in the desired configuration.

Applications of the deformable elastomeric conductive material 100 are numerous. The deformable elastomeric conductive material 100 can be used for transmitting electrical power and electrical signals, in devices which readily bend, flex and/or stretch. In some embodiments, the deformable elastomeric conductive material 100 may be formed into wires, cables, electrical conductors, electrical buses, and/or the like, which are configured to conduct electricity or transmit signals. The devices can be used to, interface with, and/or replace existing wired power and signal transmission lines, and as traces on circuit layouts where the designer may wish for the circuit board to be rendered deformable (e.g. as in the case of integrating electronic circuits into clothing). Depending on the desired application (s), the deformable elastomeric conductive material 100 may be readily configured to transmit high frequency data. Signal transmission has successfully been demonstrated from 2 microvolts up to 10V, from 5 Hz to 10 MHz rates of data transmission subject to strains in excess of 80% with no data loss. Material formulations evaluated to-date have not shown that all are equally capable of supporting high current applications or power over large distances due to the relatively high electrical impedance of the material. For example, currents in excess of 100 mA and distances in excess of a few meters may be outside the intended application space. In general, though, applications of the current invention include transmission of electrical information and data (including analog and digital signals), such as audio signals, telephony signals, voice signals, computer data, chip-to-chip communications, sensor data, control signals (e.g., from a processor), electronic information, or the like.

The deformable elastomeric conductive material 100 provides a compliant conductor that can readily flex, bend, and stretch along with a structure or highly deformable substrate. Also, various embodiments can provide data transmission within or through fabrics, clothing, textiles or other highly flexible or stretchable medium. For instance, the elastomeric conductor material may be sewn into the medium or otherwise attached with stitches, adhesives, fasteners or the like. Advantageously, the deformable elastomeric conductive material can generally conform to a structure's shape and form, even as it flexes, bends, deforms, or stretches. In the case of the human body, the fabric at bending joints, such as neck, knees and elbows, may incorporate the deformable elastomeric conductive material 100 such that the fabric will conform tightly to the shape of the appendages, without significantly hindering movement or adding weight.

Other fabric and textile articles, such as socks, gloves, boots and shirts, can integrate this technology. Special-technical suits worn by certain individuals include embedded sensors to monitor the wearer's health, status, and/or other state. These suits may be designed for soldiers, first responders, astronauts, divers, workers in hazardous environments, pilots and race car drivers, to name a few. Embedded sensors in suits may include thermometers, gas sensors (e.g., $O_2$ or $CO_2$), moisture sensors, radiation sensors, accelerometers, pressure/force gauges, biometric sensors, health monitoring sensors, positional encoders, or the like.

Data is typically transmitted wirelessly from one section of the suit to another, such as between a computer and an embedded a sensor. This means of data transmission produces a detectable radio frequency (RF) signature. For certain applications or operating environments RF transmissions are either undesirable (e.g. in a noisy RF environment in which frequency deconfliction is an issue) or not allowed by statute (e.g. in commercial aircraft). Additionally, there are some environments in which RF transmission is unfeasible either due to local RF interference (e.g. active jamming) or the particular medium in which the suit is operating (e.g. underwater). The deformable elastomeric conductive material 100 may replace this wireless technology to perform the same task without the RF signature to transmit high speed data from sensors distributed throughout the suit.

The deformable elastomeric conductive material 100 may also be incorporated into machines, vehicles, robots, or other structures for transmitting electrical power and electrical signals through or across parts or portions which can bend, flex or stretch. For example, inflatable vehicles (such as balloons, dirigibles, blimps, boats, etc.) whose shape is dynamic may utilize deformable elastomeric conductive material 100 to transmit data through the structure of the vehicle. Also, the deformable elastomeric conductive material 100 can be incorporated in many pliant structures, such as, vehicle tires or in parachute canopies. And because of their pliable nature, the deformable elastomeric conductive material 100 may continue to function, even where the machine or vehicle is deformed or damaged, such as in an accident or as a result of battle damage.

Since the deformable elastomeric conductive material 100 is formed of a filled polymer matrix it also lends itself to being applied as a surface treatment. In some embodiment, such a coating may be applied to the surface of objects under dynamic strain. The coating can function as strain gauge to measure strain based on the signal changes in the coating. Also, the coating may be used to determine locations of damage in the objects (such as a combat suit or armor), based on signal degradation where it is applied.

Figure 6A:
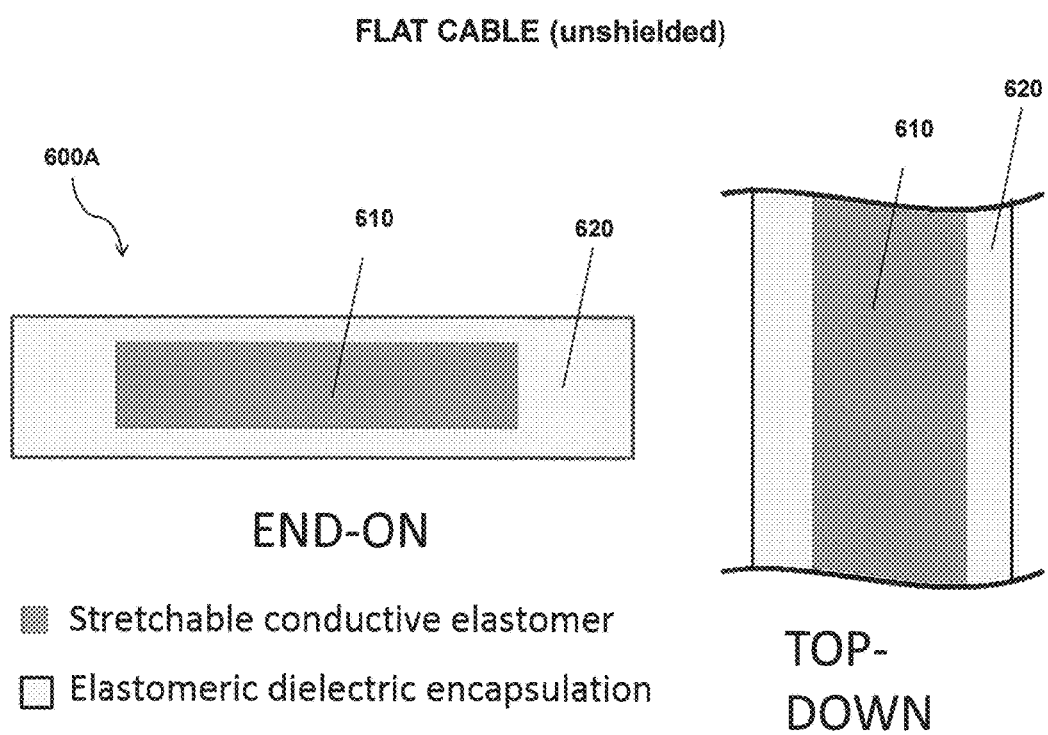
FIGS. 6A-6C show various exemplary embodiments of a deformable elastomeric conductor cables, according to embodiments of the present invention.
Figure 6B:
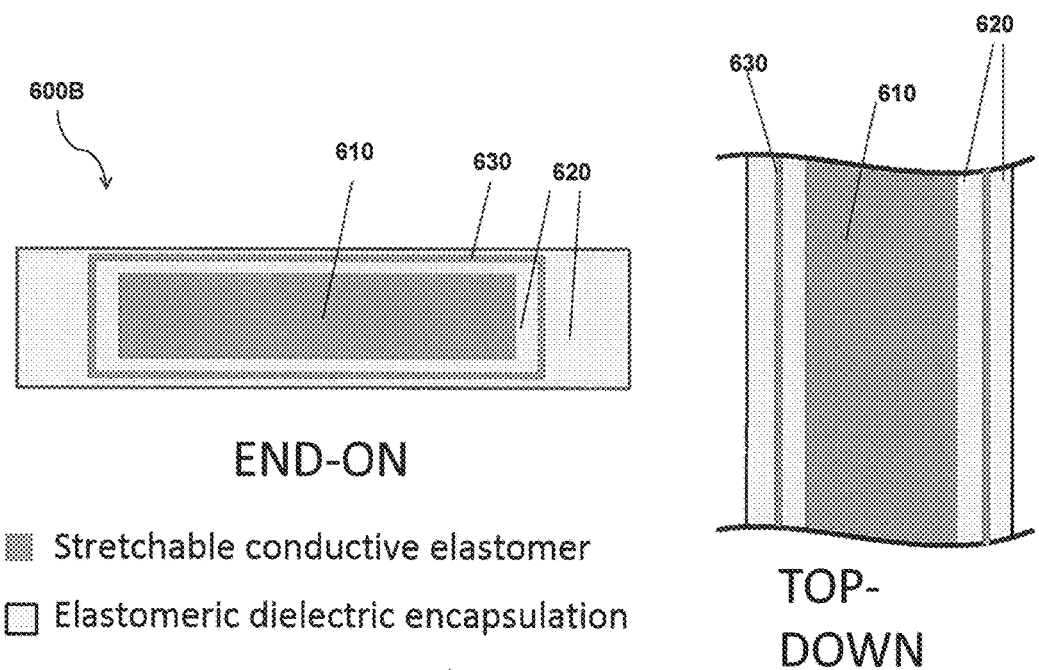
Figure 6C:
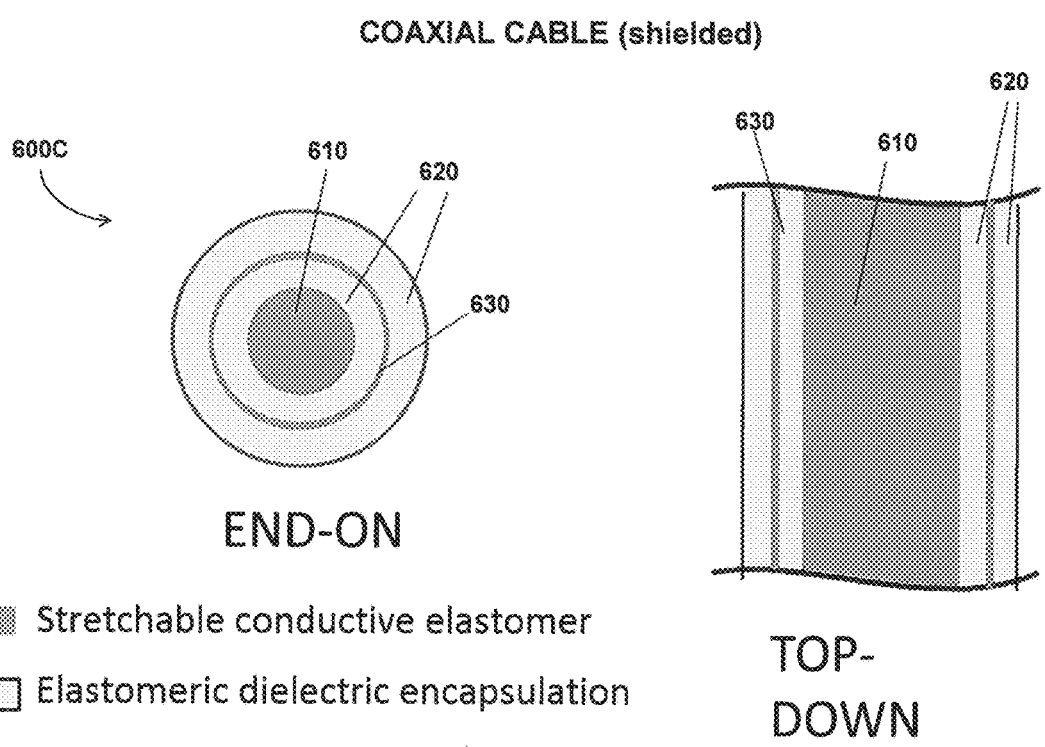

FIGS. 6A-6C show various deformable elastomeric conductor cables 600, according to embodiments of the present invention. These cables 600 generally include a deformable elastomeric conductive core 610 and a deformable insulating material 620 encapsulating the core 610. The deformable elastomeric conductive core 610 is formed of the deformable conductive material 100. The deformable insulating material 620 may be formed on a deformable dielectric or insulating material.

In some embodiments, the deformable insulating material 620 may be formed of the same polymer matrix material 102 of that used for the core 610, but without the conductive filler materials 104, for example.

In general, the conductors 600 may be any formed to be any length; for example, the conductors' length may range on the order of a millimeter to a meter. The figures show both end-on (on left) and top-down (on right) cross-sectional view of the conductors. The cross-section of the cables 600 may be rectangular, square, circular, or other shapes.

FIG. 6A shows an embodiment of a flat cable 600A which is unshielded. The height of the core 610 may be a few microns to multiple meters and the width of the core 610 may be a few microns to multiple meters, depending on the desired geometry for a specific application. The deformable insulating material 620 may surround the outer perimeter of the core 610 by similar dimension depending on the specific application. Deformable shielding material also comprised of an appropriate formulation of the deformable conductor may encapsulate the core conductor and insulator. FIG. 6B shows an embodiment of a flat coaxial cable 600B which is shielded against electromagnetic interference (EMI) To this end, the coaxial cable 600B further includes a deformable conductive shield 630. In some instances, it may be formed of the same material as the core 610 that is spaced coaxially to the core 610. The overall dimensions of this coaxial cable 600B may be similar to that of the unshielded cable shown in FIG. 6A, although, it further includes deformable conductive shield 630. The deformable conductive shield 630 may be spaced apart from the core 610 by a thin layer of deformable insulating material 620 of thicknesses ranging from a few microns to multiple millimeters depending on desired cable impdance for a specific application. For certain EMI shielding or electrostatic discharge (ESD) applications, it may be desirable to use either the same material formulations of the core conductor material. Of course, a different formulation could also be used.

In general, EMI and ESD instantiations may not require the same low impedance specifications as is the case with data transmission. It may therefore be beneficial from a cost-savings perspective to reduce the conductive filler loading in the shielding material to reduce constituent material costs. Additional deformable insulating material 620 may surround the outer perimeter of the deformable conductive shield 630 by a similar amount. FIG. 6C shows an embodiment of a round coaxial cable 600C which is shielded. The diameter of the core 610 may range from a few microns to a few millimeters depending on application, and similarly constructed as the flat coaxial cable shown in FIG. 6B. As a design rule of thumb, the smallest dimension of the deformable conductor trace or cable should be limited to no smaller than about 2 times the smallest dimension of the conductive filler in order to provide an adequate electrical percolation. It is important to note that a trace dimension between 2 and 10 times the smallest dimension of the conductive filler will result in transition into 2-dimensional electrical percolation. If a 3-dimensional electrical percolation is desired, then the smallest dimension of the conductor trace may need to be limited to 10 times the smallest dimension of the conductive filler. In the case of multiple wires or traces, they may be run either parallel or twisted (e.g., similar to conventional "twisted pair" wires) depending on the application, provided adequate insulation and/or spacing is provided between the multiple wires. The multiple wires or traces can be encased in a sheath or other covering to provide further protection from contaminants (e.g., water, dirt, etc.).

Figure 7:
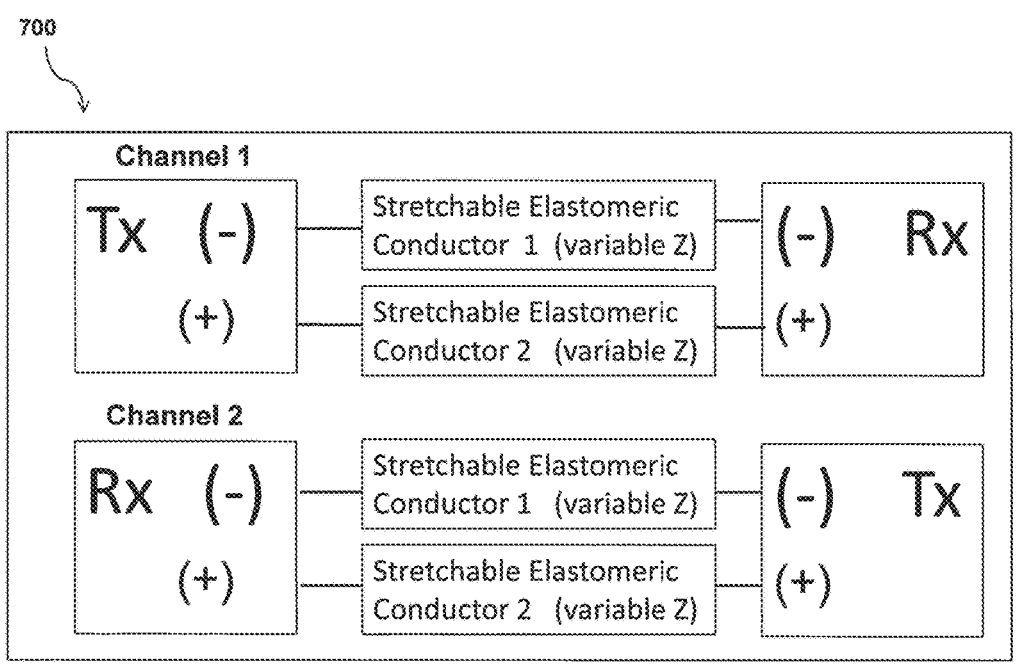
FIG. 7 shows a schematic for a differential signaling system including pairs of deformable elastomeric conductors according to an embodiment.

FIG. 7 shows a schematic for a differential signaling system 700 including pairs of deformable elastomeric conductors according to an embodiment. The deformable conductive material 100 used for the differential signaling application may be tuned (via loading and stress application) for operation at 10 MHz, for example.

As known in the art, differential signaling is a method of transmitting information electrically with two complementary signals sent on two paired wires. Differential communication technologies typically include Ethernet, Universal Serial Bus (USB), PCI, HDMI, Firewire, RS-422, RS-485, SPI, etc. This technique improves rejection of electromagnetic noise as compared with use of only one wire and an un-paired reference (ground). Both analog and digital signaling can be realized in this manner. The pair of wires is referred to as a differential pair. Differential pairs can be commonly found on printed circuit boards, in cables (such as twisted-pair cables and ribbon cables), and in many types of Commercial Off The Shelf (COTS) and military connectors.

Conventional differential electronic signal transmission uses metallic conductors which provide very limited strain before failure. By contrast, embodiments of the present invention can readily replace one or all segments of the transmission line with deformable elastomeric conductor cables 600 (or deformable elastomeric conductive material 100) to permit the transmission of electrical signals. For differential signals, such as Universal Serial Bus (USB), Twisted Pair Ethernet, Firewire, voice, and RS-485, at least one deformable elastomeric conductor cable 600 (or deformable elastomeric conductive material 100) can replace conventional copper wire, or sections of copper wire in areas where tolerance to high strain is required or anticipated.

Tests results have demonstrated that Ethernet, UART RS485, and SPI data can be successfully transmitted up to 80% strain using elastomeric conductors according to some embodiments of the present invention. This capability creates an entirely new class of electronic differential signal communications technology.

In FIG. 7, the differential signaling system 700 is configured for full-duplex communication, i.e, having the ability to both transmit and receive data simultaneously in two channels. Channel 1 and Channel 2 each include a transmission node (Tx) and a receiving node (Rx) connected by a pair of deformable elastomeric conductor cables 600. The nominal polarity of the cables is nominally indicated with positive (+) and negative (−) symbols. For full-duplex communications there will be total of four wires, with two wires spanning between respective transmission nodes Tx and receiving nodes Rx for each channel. Of course, in some instances, only one channel may be included or utilized for half-duplex communication. Both deformable sections of each pair typically will be subjected to substantially the same and simultaneous uniaxial strain.

FIGS. 8-11 show experimental data for deformable elastomeric conductors with an Ethernet implementation subject to very large deformations. Laboratory testing and characterization was performed successfully using 10-BaseT Ethernet protocol as the test signal with strains ranging from 0% up to 82%. The Ethernet test corresponded to IEEE 802.3i protocol, which is the Ethernet over twisted pair standard developed in 1990.

The particular deformable elastomeric conductors tested were prepared as follows: a twin screw extruder was used to mix a styrene-isoprene-styrene block copolymer with 25 weight % of nickel coated carbon fibers approximately 10 microns in diameter×500 micron long. The extrudate was then hot-pressed into 250 micron thick sheets. The sheets were cut into flat wires 1 cm wide×250 microns thick x various lengths ranging from 3 cm to 10 cm using a laser cutter for experimental evaluation. As will be appreciated, the deformable elastomeric conductor maintains functionality under very large strains.

Figure 8:
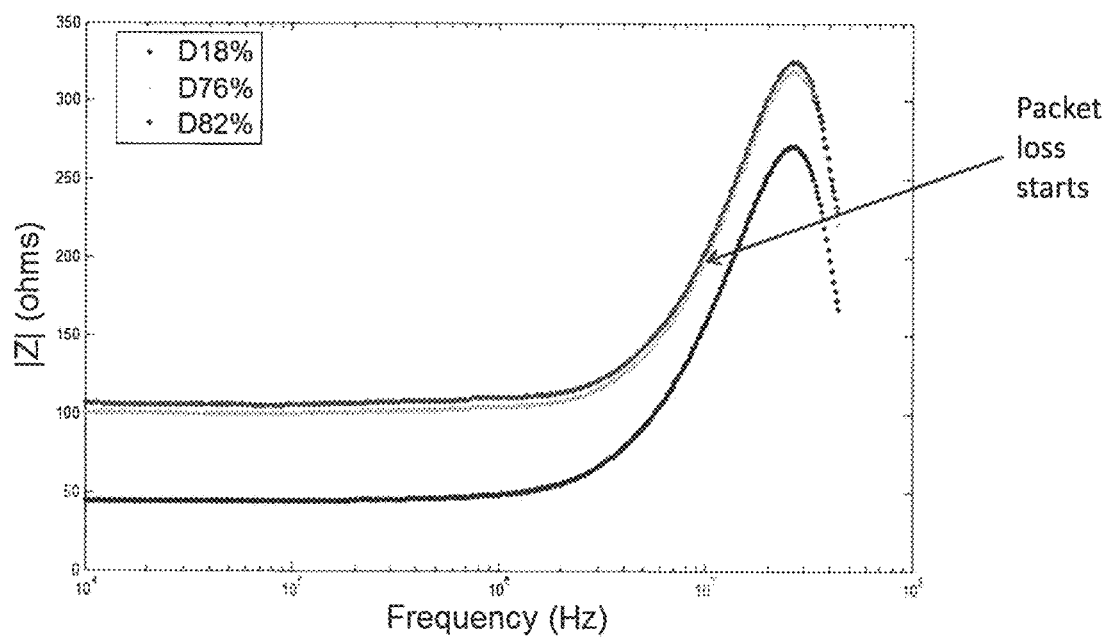
FIGS. 8-11 show experimental data for deformable elastomeric conductors with an Ethernet implementation subject to very large deformations.

FIG. 8 shows a plot of impedance of one deformable elastomeric conductor subjected to uniaxial strains of 18%, 76% and 82%, respectively. The plot shows impedance vs. frequency performance for this conductor. The impedances at 76% and 82% were approximately the same at just above 100 ohms, whereas the impedance at 18% was about slightly below 50 ohms across frequencies up to about 2 MHz.

Figure 9:
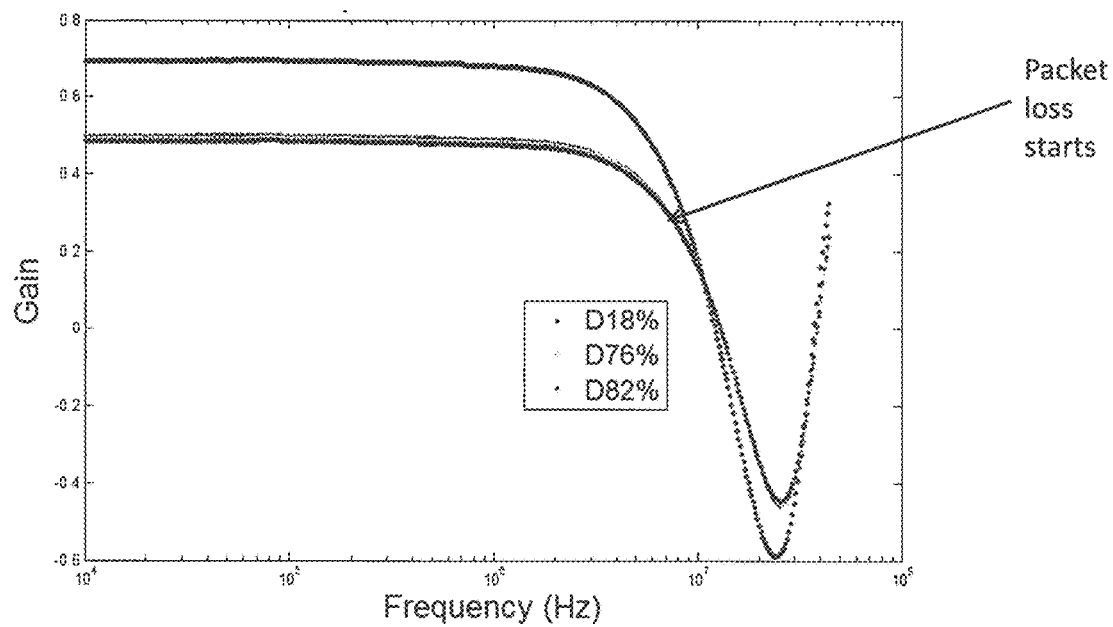

FIG. 9 shows a plot of signal gain of the deformable elastomeric conductor subjected to same uniaxial strains as in the plot of FIG. 8. The plot shows gain vs. frequency performance for this conductor. The gains at 76% and 82% were nearly the same at approximately 0.5, whereas the gain at 18% was approximately 0.7 across frequencies up to approximately 2 MHz.

For all such strains, the deformable elastomeric conductor maintained effective packet transmission. After that frequency, though, some packet loss was observed for all strains. The data demonstrates stable 10 Base-T Ethernet communications (10 Mbit) with essentially zero packet loss across a deformable elastomeric conductor even while subjected to uniaxial strain in excess of 75%. In fact, only a small, i.e., 4% packet loss, was observed only after at 82% uniaxial strain. This soft failure results only in a single-digit percent packet loss. It was further determined that reduction of the strain to pre-failure level results in return of full functionality, revealing a reversible failure mechanism.

Figure 10:
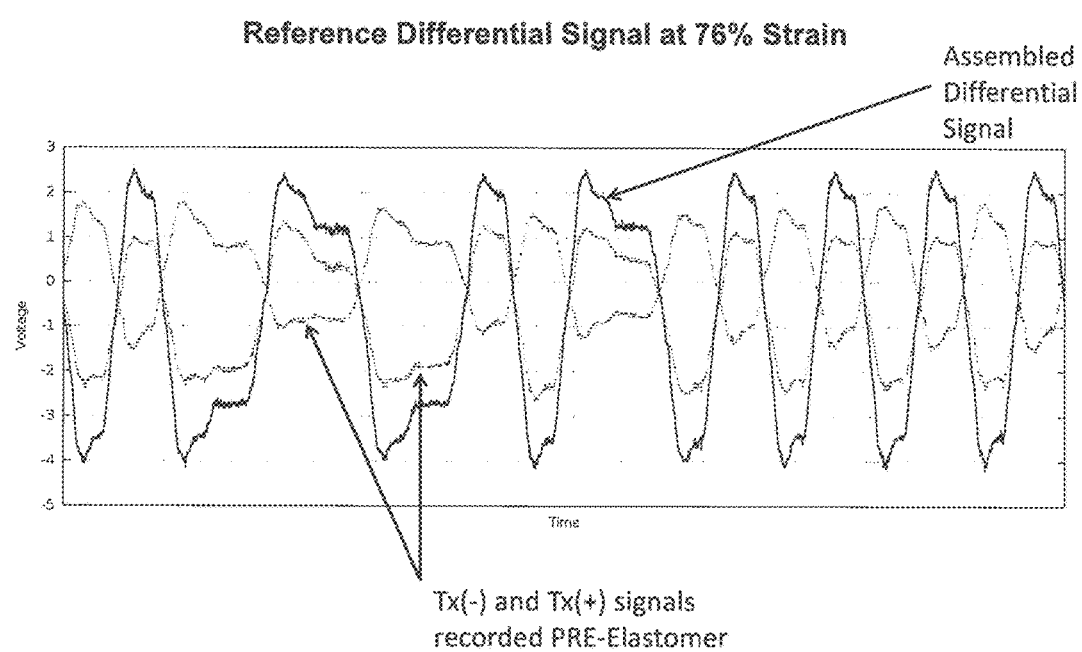

FIG. 10 shows the reference differential signal for a pair of deformable elastomeric conductors subjected to 76% uniaxial strain. The Tx(−) and Tx(+) signal values recorded that were generated prior to passing through the pair of deformable elastomeric cconductors, as well as the assembled differential signals are shown here.

Figure 11:
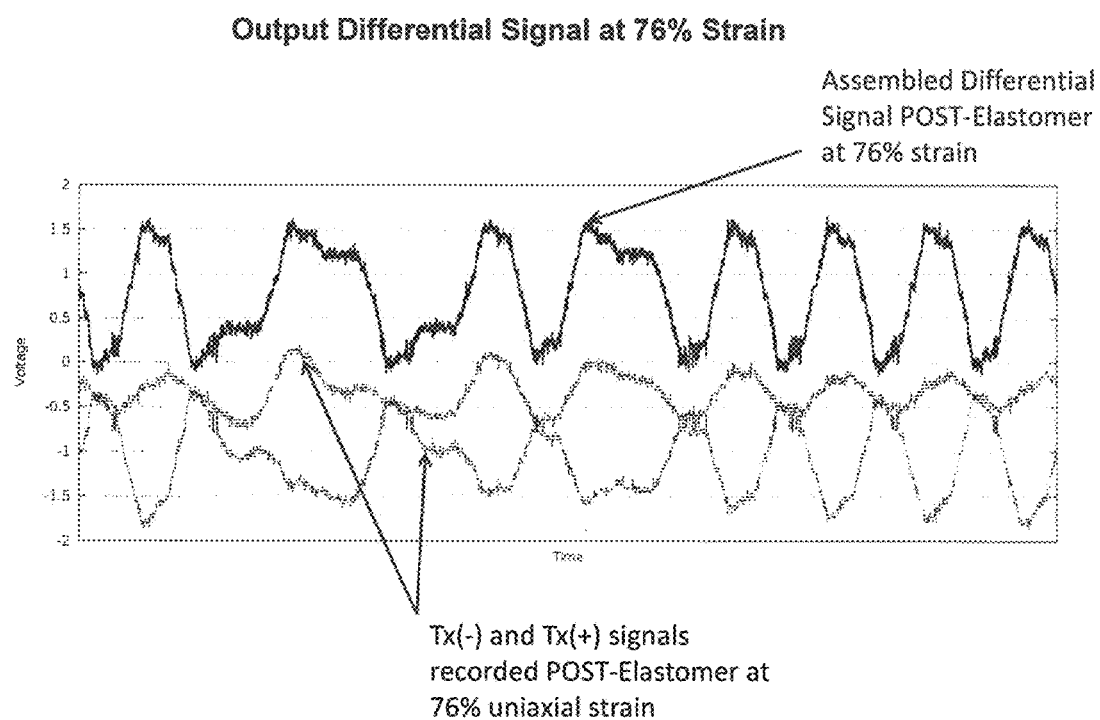

FIG. 11 shows the output differential signal of the pair of deformable elastomeric conductors subjected to 76% uniaxial strain. The Tx(−) and Tx(+) signal values recorded after passing through the pair of elastomeric conductors subjected to 76% uniaxial strain, as well as the assembled differential signals are shown here. It is noted that 76% strain is just prior to failure point of this particular deformable elastomeric conductor. The observed signal reflection behavior immediately prior to point of failure could be used for monitoring/failure prediction and mitigation.

Figure 12:
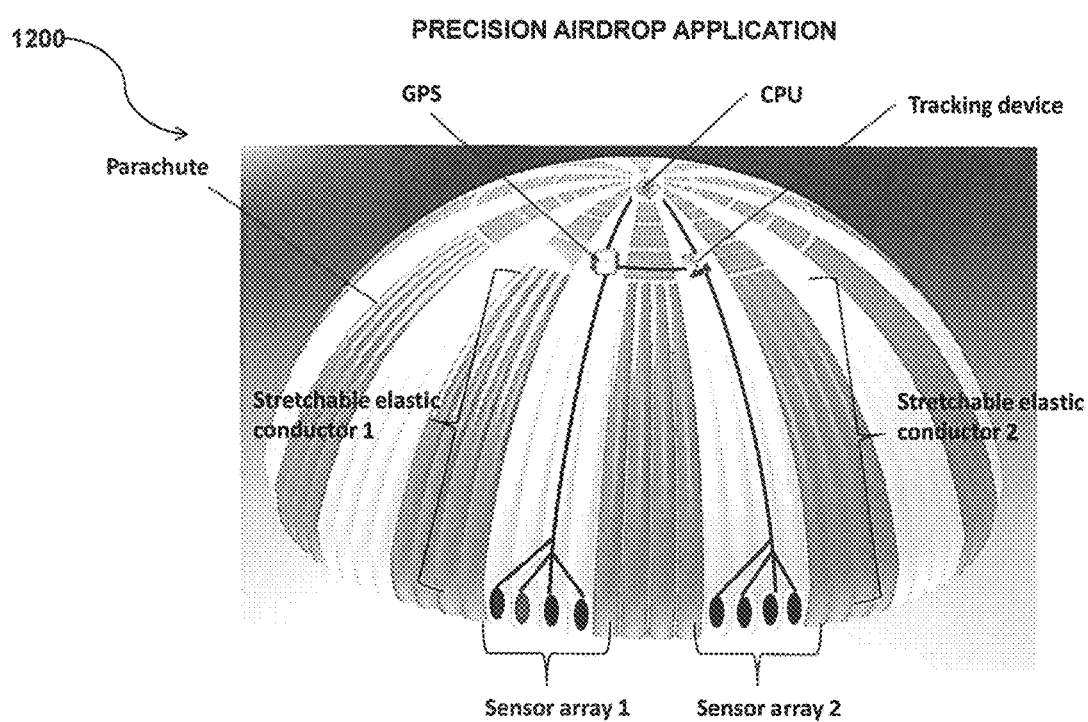
FIG. 12 shows a precision airdrop application according to an embodiment.

FIG. 12 shows a precision airdrop application 1200 according to an embodiment. This application includes a parachute having multiple distributed sensor/actuator arrays for shape control for precise guidance, and/or experimental evaluation of canopy performance, especially during the violent open-shock event. The deformable elastomeric material provides data connectivity between the spatially distributed components as well as serving as the principle conductive component in the stretchable actuators and sensors. The sensor/actuator (transducer) arrays are spatially distributed so as to give adequate spatial resolution. The actuators vary their mechanical impedance with applied electric field via the deformable conductor material, and thereby change the shape of the parachute canopy while under aerodynamic load. The shape is measured for feedback control using the deformable sensor array. The CPU calculates the necessary shape required for steering maneuvers based on current trajectory (from GPS data), wind data, and desired landing location. The passive/active tags provide tracking /monitoring capability from overhead satellites, aircraft, or personnel on the ground.

Large differences in strain magnitudes and gradients between deployed and packed states can damage traditional conductive materials. And stiff components can interfere with successful canopy deployments. Thus, advantageously deformable elastomeric conductive wires are embedded in canopy of the parachute coupling the sensor arrays with the GPS, CPU and tracking device. These wires minimize mechanical interference with canopy deployments, avoid the use of wireless transmitters, and allow the electronic signal pathways to survive the extremely violent and destructive open-shock event, in which more conventional approaches such as woven metallic threads have been shown to be unsurvivable. For example, electrical signals may be used to adjust local canopy membrane stiffness 'on the fly' to enable directional control via canopy shape change.

Figure 13A:
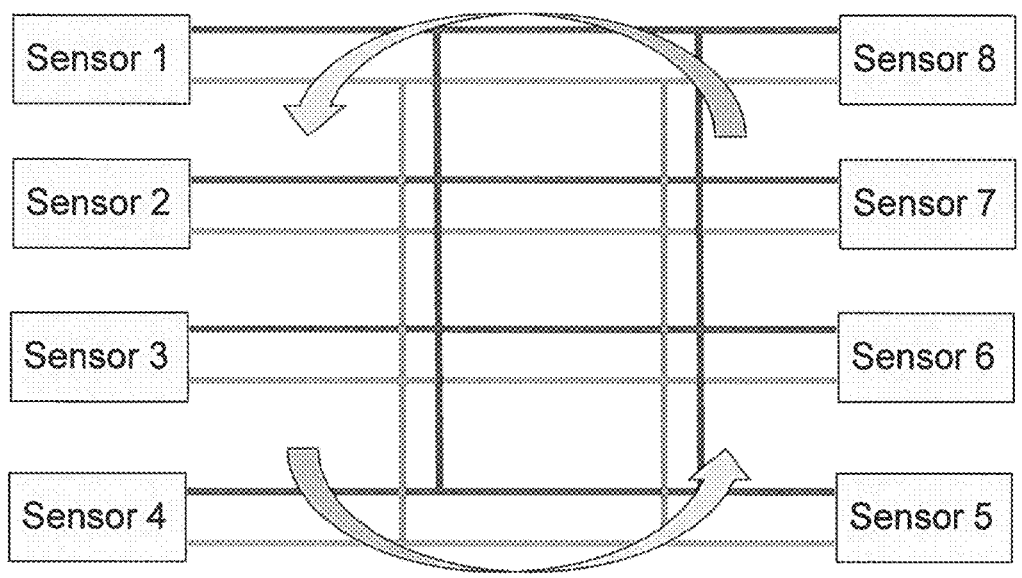
FIGS. 13A and 13B show network architectures including deformable cables according to embodiments.
Figure 13B:
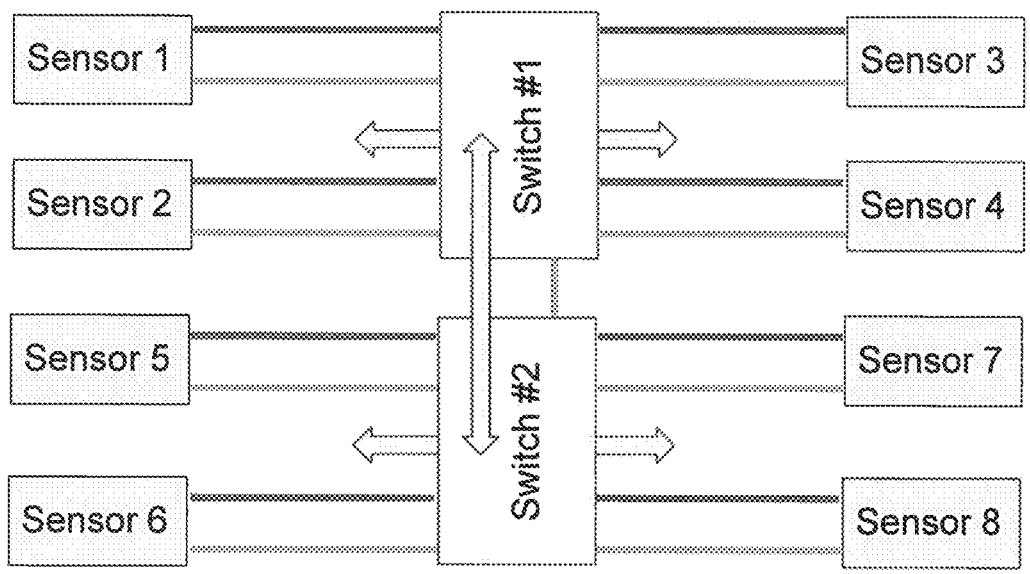

FIGS. 13A and 13B show exemplary differential signaling architectures which incorporate deformable elastomeric conductor according to embodiments. Network topologies can be distilled into the following categories: bus, ring, star, tree and mesh.

FIG. 13A is an example of a "bus" network topology utilizing the deformable cables that would be utilized in an I2C or SPI protocol data network. Here, single or redundant differential pairs are routed to each sensor. This architecture may require minimal hardware for high connectivity. However, because each pair is needed to transmit and receive, typically only one device can be used at a time. Redundant connectors may be possible at low frequencies though. Bus network protocols include (but not limited to): 10Base-2, 10Base-5, CAN Bus (Computer Area Network), I2C (Inter-Integrated Circuit), SPI (Serial Peripheral Interface), 1-Wire, RS-232 (Recommended Standard 232), RS-422, RS-423, RS-485, USB (Universal Serial Bus), Firewire (IEEE 1394), AppleBus, AppleTalk, AIRINC 429, AIRINC 818, InfiniBand, MIDI, Serial ATA, SpaceWire, PCI Express, Fibre Channel.

FIG. 13B utilizes a common network switch to create a "mesh" topology network having two switches, but using the stretchable "Ethernet" cables. Mesh network protocols include (but not limited to): Wi-Fi (802.11a/b/g/n) and LAN (Local Area Network) such as Ethernet (802.3x) where x encompasses more than 40 different standards.

The switches function as a hub for many sensors. This architecture may require more hardware than serial architecture, such a providing a transceiver at every device node, but can be configured to provide multiple device communication depending of topology. Additionally, this architecture can provide hardware error correction and may be most appropriate in highly dynamic systems due to inherent data corruption and detection.

It should be appreciated, however, that the network topology is separate from the medium (i.e., the physical hardware) being used to carry the data. Any set of nodes and edges in a graph will fall into one of the above network topologies and the stretchable cables are applicable to all network topologies. That being said, the deformable cables are not to be construed as being tied to any specific protocol or network topology.

Figure 14A:
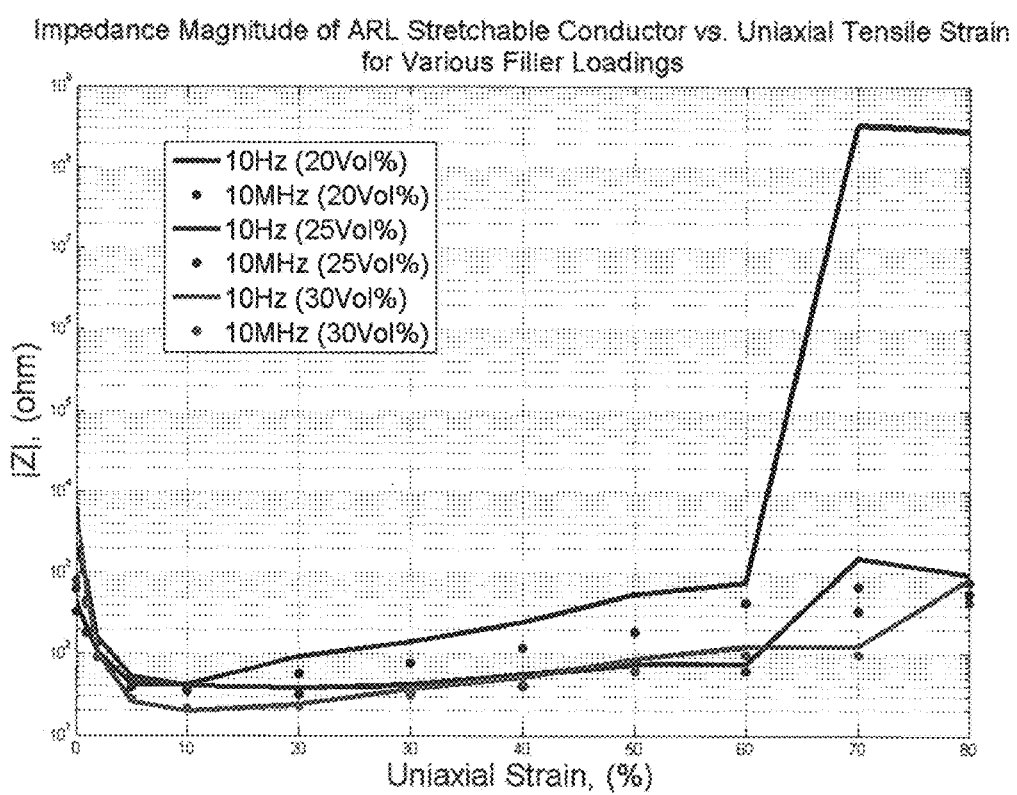
FIGS. 14A-14N show operational data for certain embodiments.
Figure 14B:
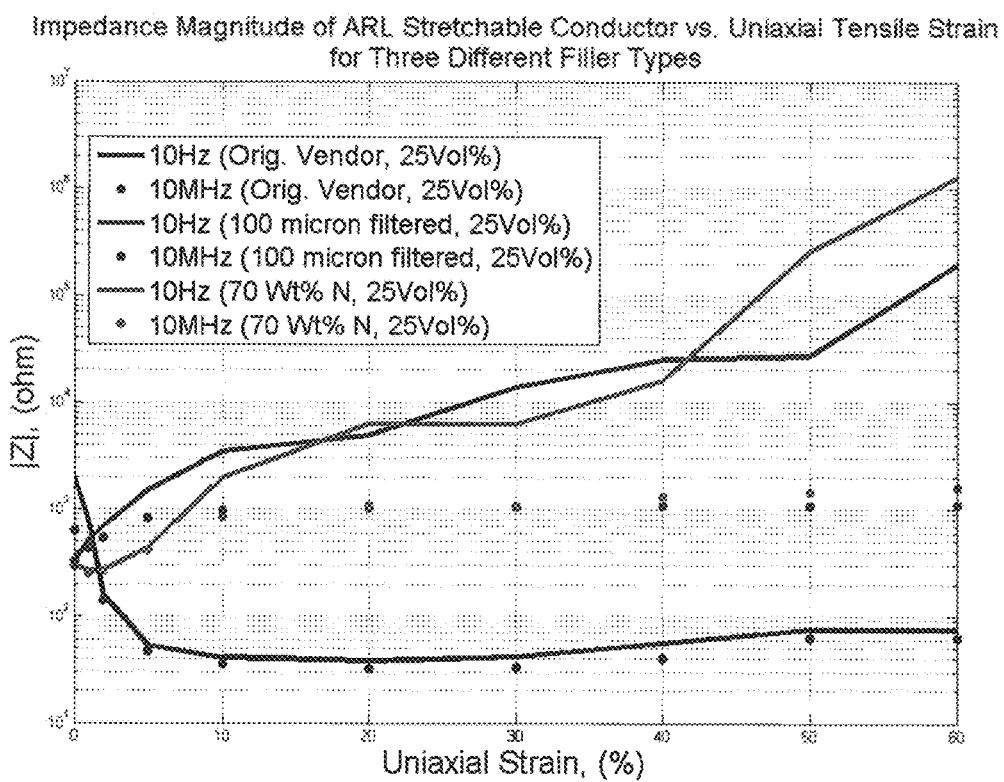
Figure 14C:
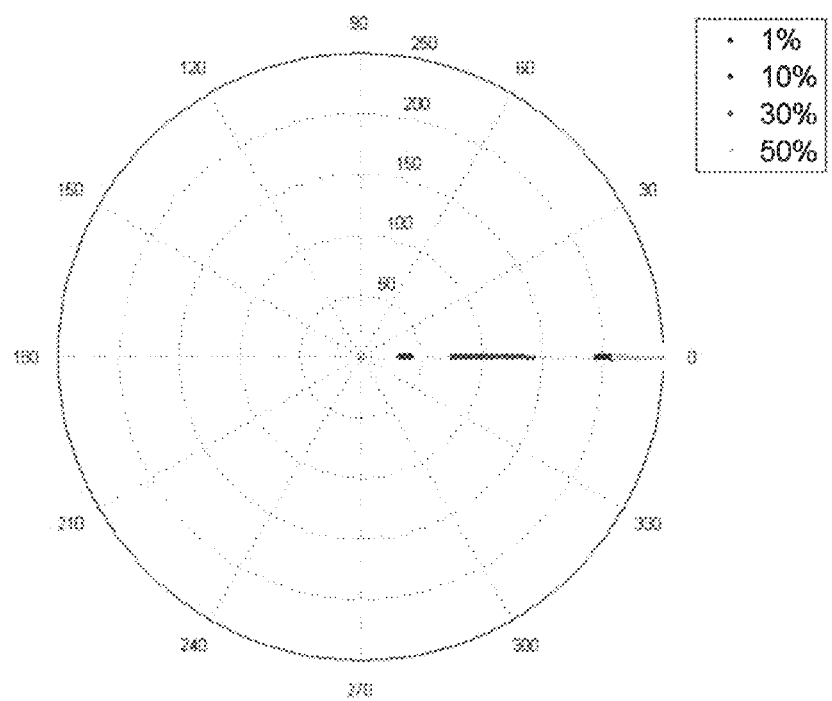
Figure 14D:
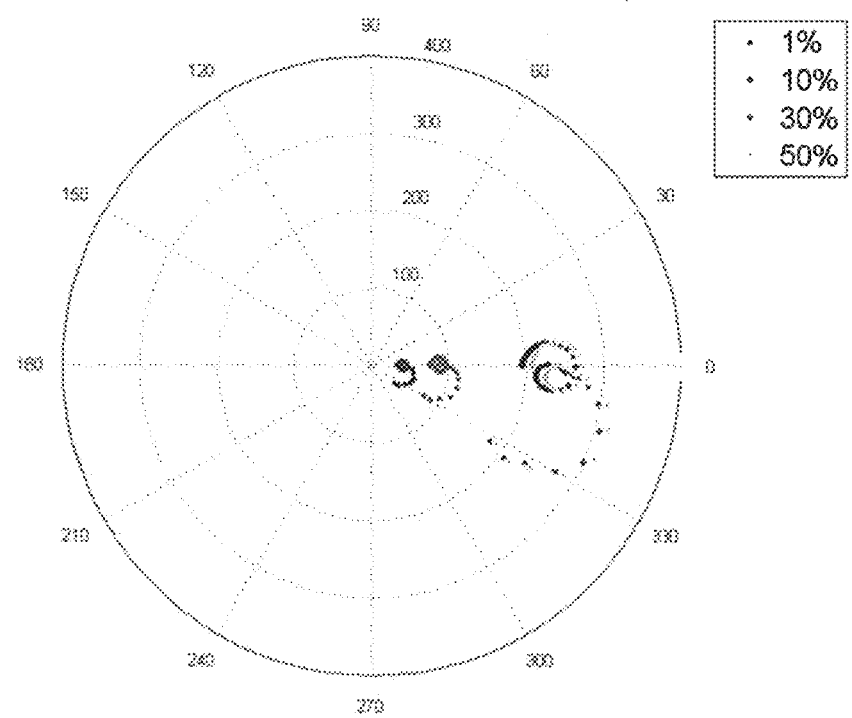
Figure 14E:
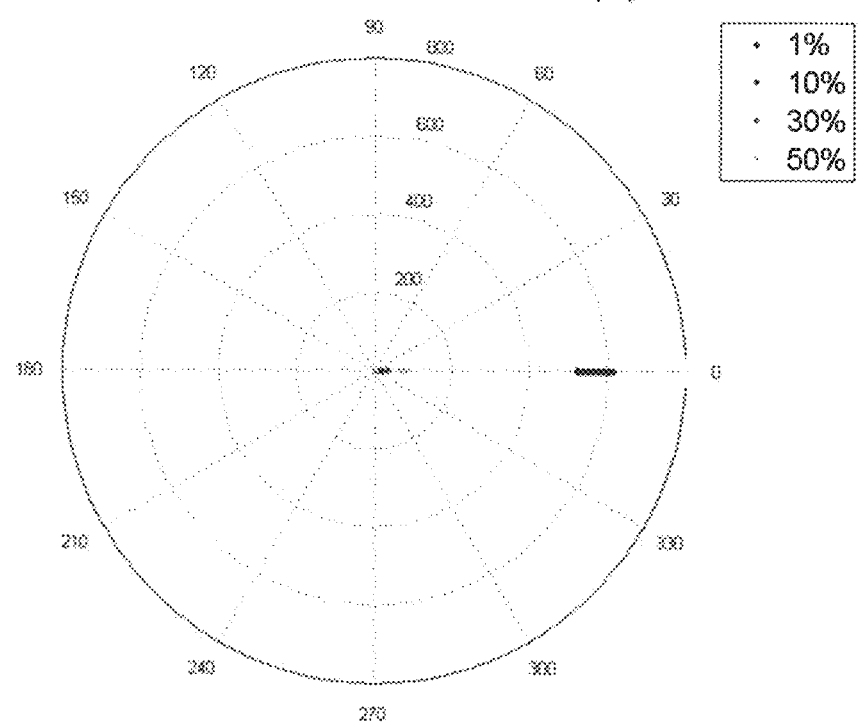
Figure 14F:
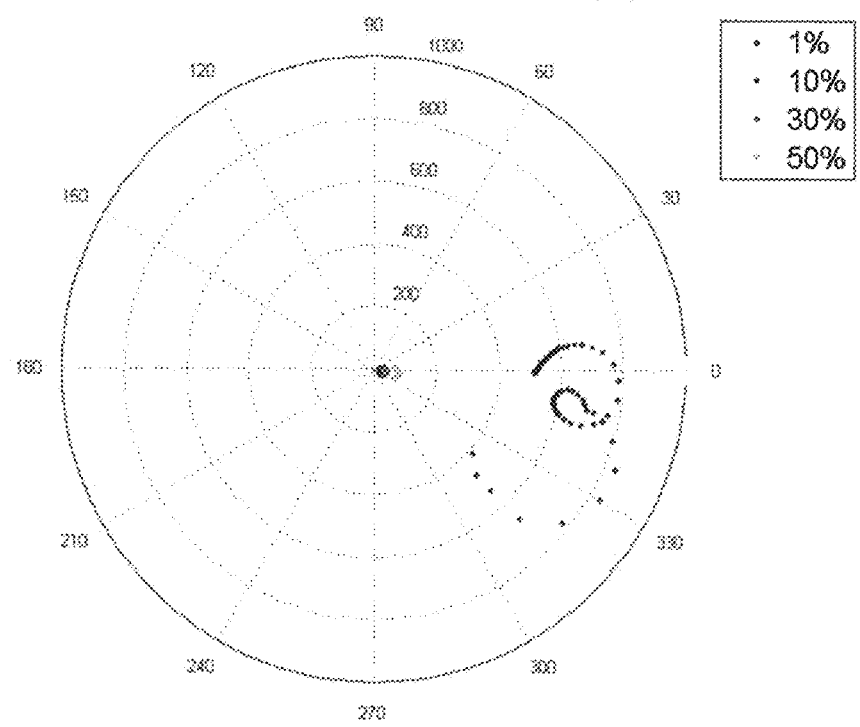
Figure 14G:
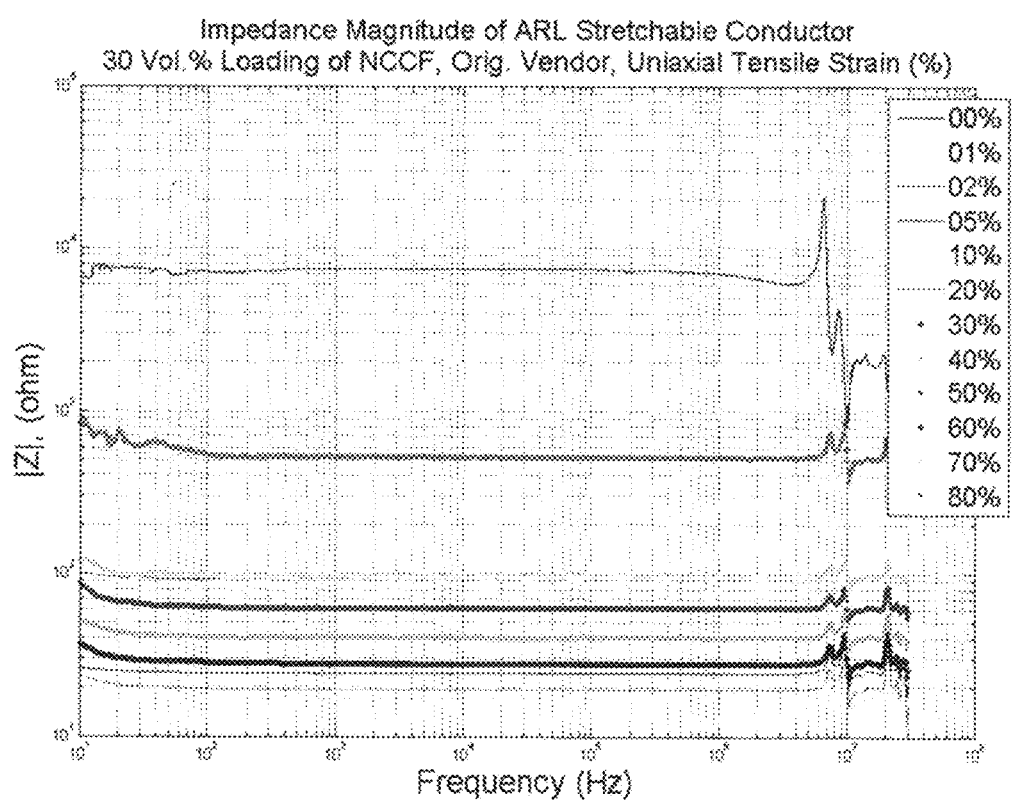
Figure 14H:
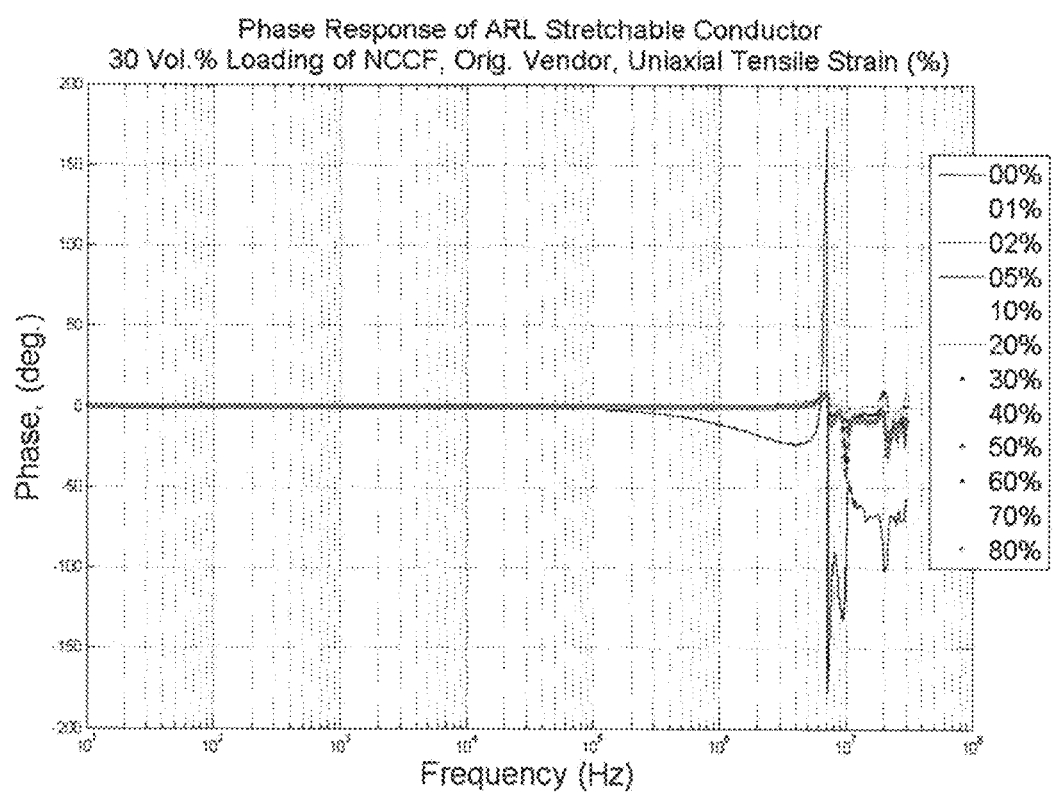
Figure 14I:
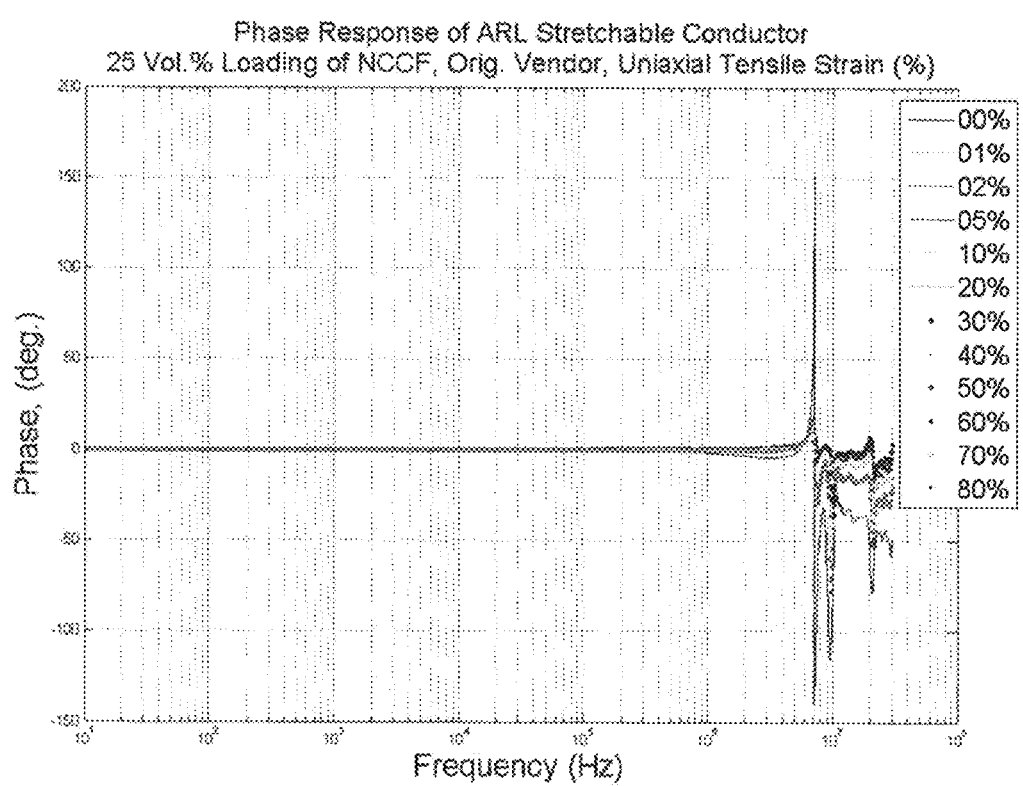
Figure 14J:
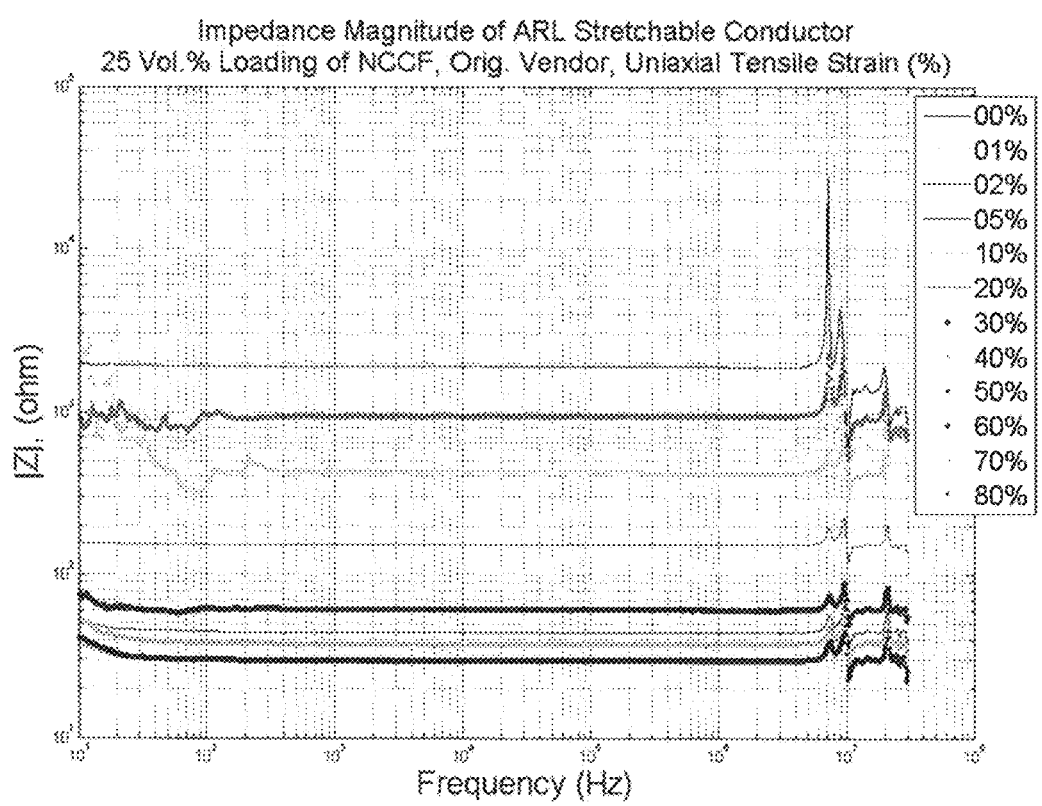
Figure 14K:
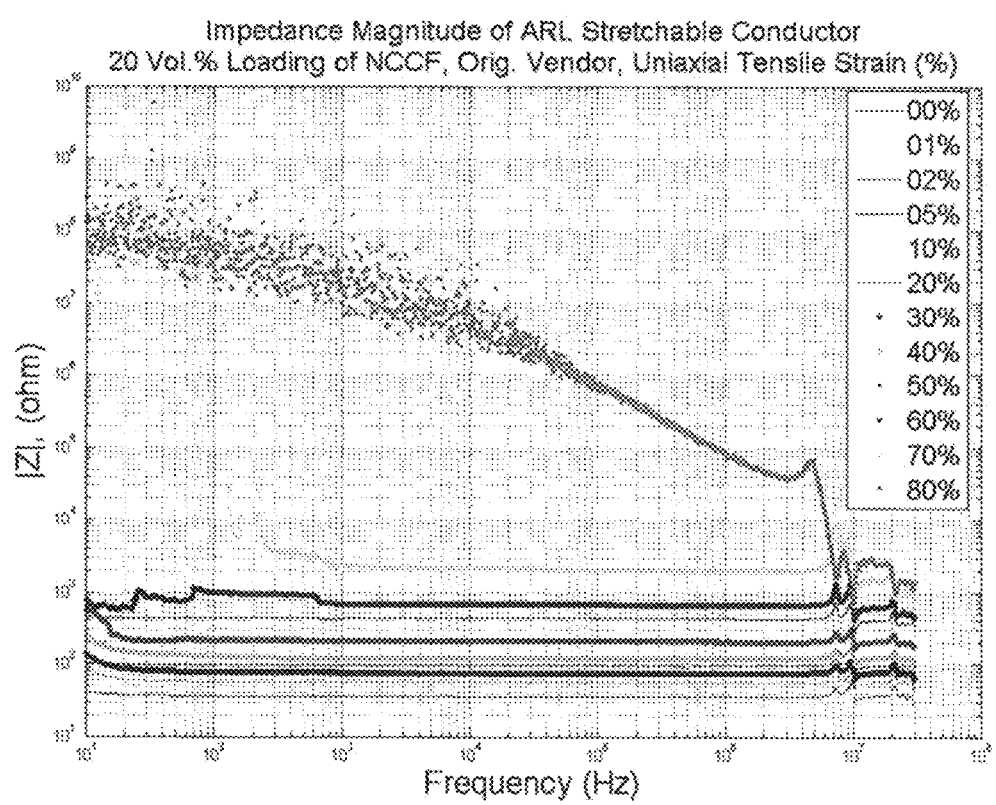
Figure 14L:
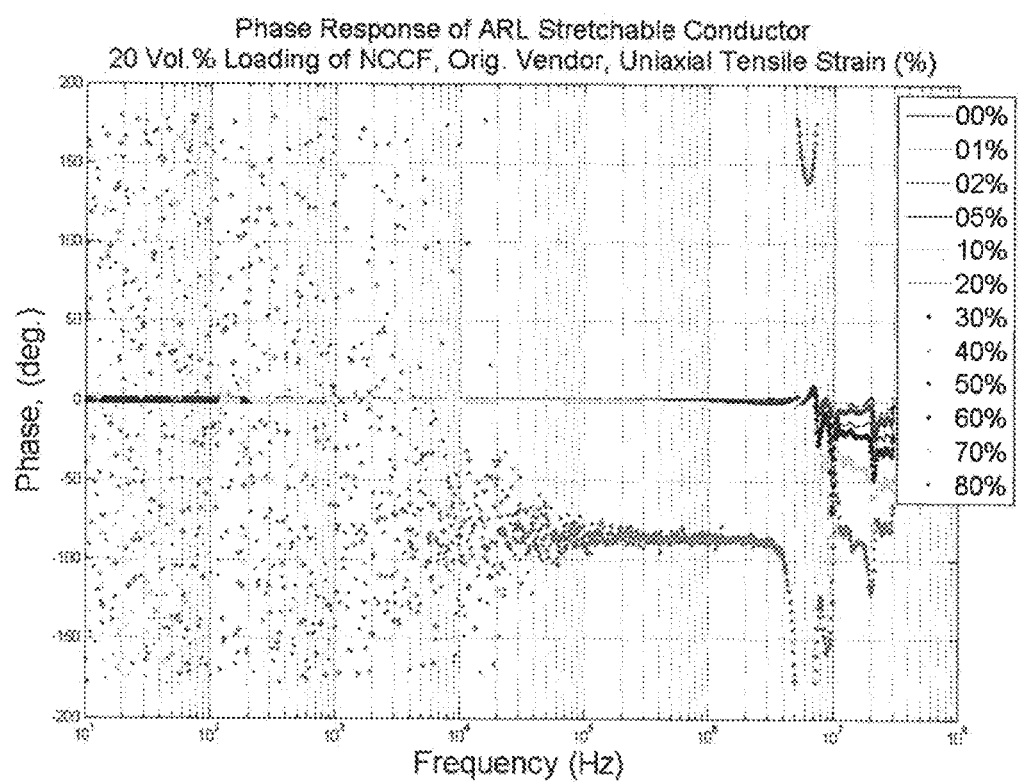
Figure 14M:
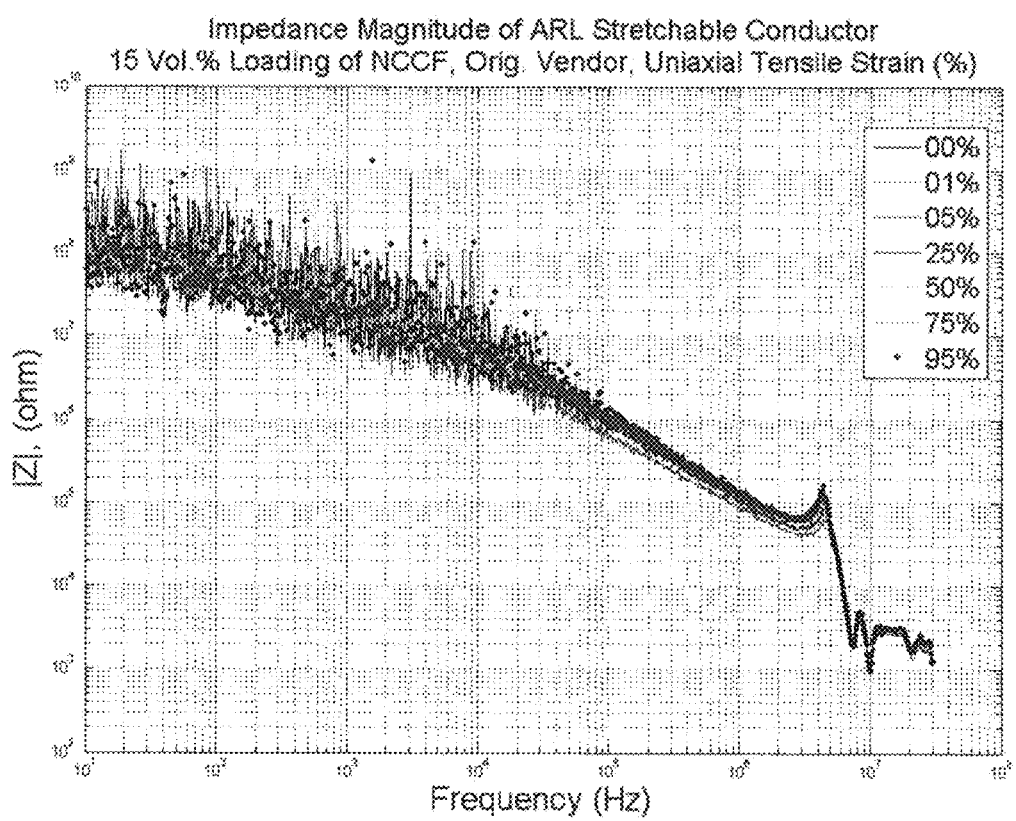
Figure 14N:
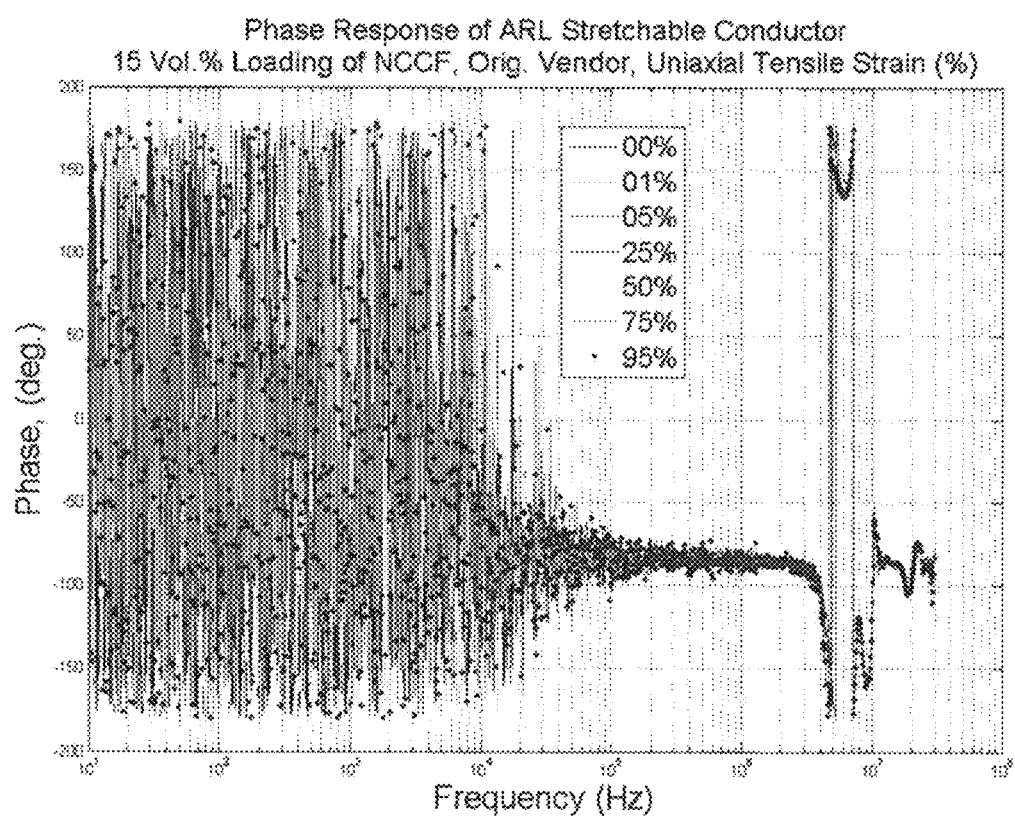

FIGS. 14A-14N are plots showing the performance for various test specimens according to embodiments. The specimens were prepared having different concentrations of conductive filler materials 104. During preparation, chopping was used. Chopping includes cutting the fibers to length, which in combination with their diameter determines their aspect ratio. The concentrations are on a volumetric basis. The specimens were tested at various frequencies: 10 Hz, 10 kHz, and/or 10 MHz, as indicated in the individual plots.

In the plots, the data corresponds to the following specimens types:
(1) Example 1) "Orig. Vendor" is 60 weight percent nickel coated carbon fiber, 10 micron diameter, AR=50, nickel coating applied post-chopping, this is also referred to as "AR=50" in one of the figures.
(2) Example 2) "100 micron filtered" is 40 weight percent nickel coated carbon fiber, 10 micron diameter, AR=50, nickel coating applied prior to chopping, post-processed using a 100 micron filter to remove debris from the chopping process.
(3) Example 3) "70 Wt % N" is 70 weight percent nickel coated carbon fiber, 10 micron diameter, AR=50, nickel coating applied prior to chopping, no post-processing.

The "Vol %" number indicates what volume percent of the filler that was mixed into the elastomer (e.g. 25 Vo l% indicates that 25 percent of the final material volume is comprised of the filler material, and 75% of the elastomer).

FIG. 14A shows the effect of filler loading in the elastomer on the electrical impedance response to uniaxial strain. For the material formulation represented in FIG. 14A, the optimal loading is around 25 volume percent, and the optimal performance range in strain is between 5% and 60%. The performance range for strain is tunable by the material formulation. FIG. 14B shows the ability to control the sign of the electrical impedance response to applied strain by modifying the material formulation. FIGS. 14C & E show that low frequency shifts in impedance all lie along the real axis and thus are dominated by shift in electrical resistance, and that the amount of impedance shift can be controlled by filler loading. FIGS. 14D & F show that at higher frequencies, the reactive portion of impedance becomes dominant, and that the degree to which circuit resonances are present, and at what frequencies they are present can be tuned via strain, material formulation, and filler loading independently. This has implications to mechanically responsive antenna design, mechanically adaptive electronic filters, and design of stretchable electronic components such as resistors, capacitors, inductors, transistors, and memristors.

FIGS. 14G-N shows shifts in electrical impedance and phase in the frequency domain for single wires produced from materials with three different filler loadings, and subjected to various uniaxial strains. FIGS. 14M-N show poor impedance and phase performance, and thus indicate that there is a requirement for minimum filler loading volume percent to enable signal transmission. This minimum varies depending on the particular material formulation used. For the example material formulation represented in FIGS. 14G-N, the volume percent requirement is around 20%.

The plots demonstrate that the filler type, the way the filler is processed, and how much of the filler is incorporated all have significant impacts on the performance.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

All patents, patent applications, articles and other references mentioned herein are hereby incorporated by reference in their entireties.

We claim:

1. A deformable elastomeric conductor configured to transmit electrical signals, the conductor comprising:
   a monolithic elastomeric polymer matrix; and
   conductive filler material uniformly dispersed throughout the monolithic elastomeric polymer matrix which renders the material electrically conductive,
   wherein the conductive filler material comprises a plurality of straight and rigid metallic particles to enable adjacent particles to slide along each other without entanglement and remain in contact and/or in close proximity so as to maintain conductive pathways in the matrix such that the electrical conductivity of the material, when the conductor is subjected to deformation between 0 and 100% strain, remains substantially the same, and
   wherein, over a transmission distance of an electrical signal through the conductor, the transmission does not suffer greater than about 3 dB of signal attenuation when subjected to said deformation.

2. The deformable elastomeric conductor according to claim 1, wherein the elastomeric polymer matrix comprises: poly(styrene-b-isoprene-b-styrene), poly(styrene-b-ethylene-co-butylene-b-styrene), poly(styrene-b-butadiene-b-styrene), polybutadiene, natural rubber, silicone elastomer, epoxy elastomer, poly(propylene oxide) rubber, chloroprene, butyl elastomers, acrylonitrile butadiene styrene, butyl elastomer, nitrile elastomer, polydimethylsiloxane (PDMS), neoprene, polyisoprene, acrylic, polyurethane, nylon, polyethylene, polypropylene, polystyrene, polyvinyl chloride (PVC), styrene-iso-styrene (SIS), polytetrafluoroethylene, epoxy resin, or polyimide.

3. The deformable elastomeric conductor of claim 1, wherein the straight and rigid metallic particles of the conductive filler material comprises: nickel-coated carbon fibers, nickel nanorods, nickel flakes, nickel-coated graphite, copper nanorods, copper flakes, nickel nanostrands, nickel-coated carbon nanotubes, silver nanorods, silver flakes, copper fiber, silver fiber, nickel fiber, stainless steel fiber, gold nanorods, gold flakes, or gold fibers.

4. The deformable elastomeric conductor according to claim 1, wherein the length of the conductor ranges on the order of a millimeter to a meter.

5. The deformable elastomeric conductor according to claim 4, wherein the particles have an aspect ratio greater than 1.5.

6. The deformable conductor according to claim 1, wherein the amount of particles in the elastomeric polymer matrix ranges from 0.01 to 50 vol. %.

7. The deformable elastomeric conductor according to claim 1, wherein the electrical signals to be transmitted include: AC power, DC power, analog signals, digital signals, audio signals, telephony signals, voice signals, computer data, sensor data, control signals, or electronic information.

8. The deformable elastomeric conductor according to claim 1, being attached to, or incorporated into, a structure which is configured to readily bend, flex, deform, or stretch.

9. The deformable elastomeric conductor according to claim 8, wherein the conductor readily conforms to the body of structure as it bends, flexes, deforms, or stretches.

10. The deformable elastomeric conductor according to claim 8, wherein the structure comprises clothing, textile, or fabric material.

11. The deformable elastomeric conductor according to claim 8, wherein the deformable elastomeric conductor is applied as a coating to the structure.

12. The deformable elastomeric conductor according to claim 1, further comprising: a deformable insulating material encapsulating the elastomeric polymer matrix.

13. The deformable elastomeric conductor according to claim 12, further comprising: a deformable conductive shield embedded in the deformable insulating material to shield against electromagnetic interference (EMI).

14. The deformable elastomeric conductor according to claim 13, wherein the conductive shield is formed of the same material as the elastomeric polymer matrix.

15. The deformable elastomeric conductor according to claim 1, wherein the conductor is formed into a wire, cable, twisted pair wires, ribbon cable, or electrical bus.

16. A system comprising:
   a transmission node;
   a receiving node; and
   at least one deformable elastomeric conductor according to claim 1 positioned between the transmission node and the receiving node defining a channel.

17. The system according to claim 16, configured for duplex transmission comprising:
   a first transmission node and a first receiving node defining a first channel; and
   a second transmission node and a second receiving node defining a second channel.

18. The system according to claim 16, wherein the at least one deformable elastomeric conductor is configured to transmit differential signals via Ethernet, Universal Serial Bus (USB), PCI, HDMI, Display Port, Firewire, RS-422, or RS-485 communication protocols,
   the at least one deformable elastomeric having an impedance |Z| which remains substantially the same and does not exceed more than about 100 ohms over a frequency of 1-100 MHz for strains ranging from 0% up to about 80%.

19. A method comprising:
transmitting differential signals through the at least one deformable elastomeric conductor according to the system of claim 18.

20. An airdrop application comprising:
a parachute having at least one sensor or actuator array; and
at least one deformable elastomeric conductor according to claim 1 connected to the at least one sensor or actuator.

21. The material of claim 1, wherein the conductivity of the material remains approximately 10 S/cm or more between 0 and 100% strain.

22. The material of claim 1, wherein the material remains conductive in excess of 500% strain.

* * * * *